United States Patent
Inaguma et al.

(10) Patent No.: US 7,047,555 B1
(45) Date of Patent: May 16, 2006

(54) IN-BUILDING CATV SYSTEM, DOWN-CONVERTER, UP-CONVERTER AND AMPLIFIER

(75) Inventors: Mitsuhiko Inaguma, Nisshin (JP); Shigemitsu Toriyama, Nisshin (JP); Yasuo Nakayama, Nisshin (JP)

(73) Assignee: Masprodenkoh Kabushikikaisha, Nisshin (JP)

(*) Notice: Subject to any disclaimer, the term of this patent is extended or adjusted under 35 U.S.C. 154(b) by 1071 days.

(21) Appl. No.: 09/621,527

(22) Filed: Jul. 21, 2000

Related U.S. Application Data

(63) Continuation-in-part of application No. 09/507,712, filed on Feb. 18, 2000, now Pat. No. 6,615,407.

(30) Foreign Application Priority Data

| Jul. 23, 1999 | (JP) | ............................................ 11-209551 |
| Oct. 18, 1999 | (JP) | ............................................ 11-295613 |
| Feb. 18, 2000 | (JP) | ............................................ 2000-041099 |

(51) Int. Cl.
*H04N 7/16* (2006.01)
*H04N 7/18* (2006.01)
*H04N 7/173* (2006.01)

(52) U.S. Cl. .................... 725/149; 725/78; 725/126; 725/127; 725/128

(58) Field of Classification Search .................... 725/71, 725/74, 78, 80, 83, 111, 118, 126–128, 148–149; 455/3.01, 3.02
See application file for complete search history.

(56) References Cited

U.S. PATENT DOCUMENTS 3,778,716 A * 12/1973 Stokes ........................ 725/73

| RE31,639 | E | * | 7/1984 | Nicholson | .................. 725/127 |
| 4,494,138 | A | * | 1/1985 | Shimp | ........................ 725/127 |

(Continued)

FOREIGN PATENT DOCUMENTS

| JP | 64-062935 | 3/1989 |
| JP | 03-006981 | 1/1991 |
| JP | 03-019472 | 1/1991 |
| JP | 03-074987 | 3/1991 |
| JP | 05-268605 | 10/1993 |
| JP | 09-083830 | 3/1997 |
| JP | 9-510071 | 10/1997 |
| JP | 10174084 | 6/1998 |
| JP | 10-174084 | 6/1998 |
| JP | 10-215445 | 8/1998 |
| JP | 11004428 | 1/1999 |
| JP | 11220716 | 8/1999 |
| JP | 11355738 | 12/1999 |

*Primary Examiner*—John Miller
*Assistant Examiner*—Michael W. Hoye
(74) *Attorney, Agent, or Firm*—Davis & Bujold, P.L.L.C.

(57) ABSTRACT

In order to correctly perform frequency conversion without using a pilot signal from an external system in a CATV system in which an upward signal is converted to a high frequency in-building upward signal using an up-converter and the in-building upward signal is converted to the original upward signal using a down-converter, there is proposed a down-converter provided with a reference oscillation circuit for generating a reference signal with a frequency lower than that of a downward signal or the in-building upward signal. The in-building upward signal is frequency-converted using the reference signal and the reference signal is transmitted to a transmission line of the terminal side. A bi-directional amplifier on the transmission line can not only amplify the downward signal and the in-building upward signal bi-directionally but also transmit the reference signal to an up-converter of the terminal side. The transmitted reference signal is extracted in the up-converter and the upward signal is frequency-converted to the in-building upward signal.

23 Claims, 12 Drawing Sheets

U.S. PATENT DOCUMENTS

| | | | | |
|---|---|---|---|---|
| 4,569,084 A | * | 2/1986 | Takahama | 455/131 |
| 5,073,930 A | * | 12/1991 | Green et al. | 725/71 |
| 5,230,086 A | * | 7/1993 | Saul | 455/502 |
| 5,437,052 A | * | 7/1995 | Hemmie et al. | 725/73 |
| 5,548,811 A | * | 8/1996 | Kumagai et al. | 455/192.2 |
| 5,557,319 A | | 9/1996 | Gurusami et al. | 348/11 |
| 5,574,964 A | * | 11/1996 | Hamlin | 725/78 |
| 5,760,822 A | * | 6/1998 | Coutinho | 725/74 |
| 5,765,099 A | * | 6/1998 | Georges et al. | 455/14 |
| 5,835,128 A | * | 11/1998 | Macdonald et al. | 725/81 |
| 6,006,066 A | * | 12/1999 | Krimmel | 725/127 |
| 6,094,211 A | * | 7/2000 | Baran et al. | 725/125 |
| 6,151,559 A | * | 11/2000 | Williams | 702/58 |
| 6,160,571 A | * | 12/2000 | Wang | 725/127 |
| 6,181,365 B1 | * | 1/2001 | Nakagawara | 725/111 |
| 6,212,397 B1 | * | 4/2001 | Langston et al. | 455/500 |
| 6,430,742 B1 | * | 8/2002 | Chanteau | 725/74 |
| 6,481,013 B1 | * | 11/2002 | Dinwiddie et al. | 725/80 |
| 6,486,907 B1 | * | 11/2002 | Farber et al. | 725/78 |

* cited by examiner

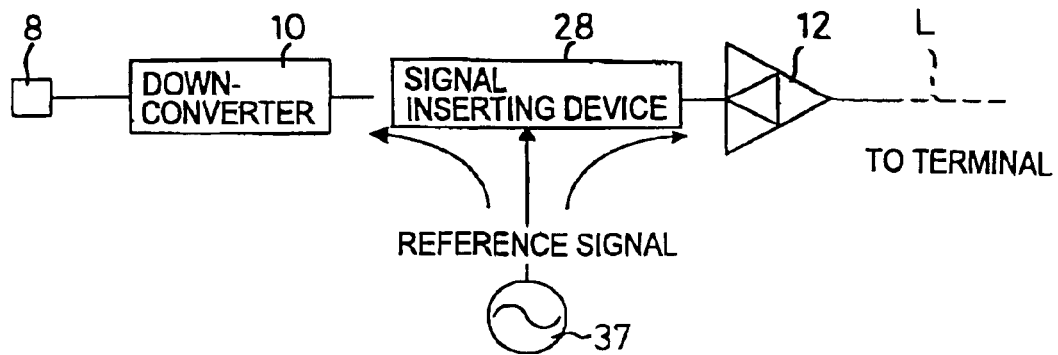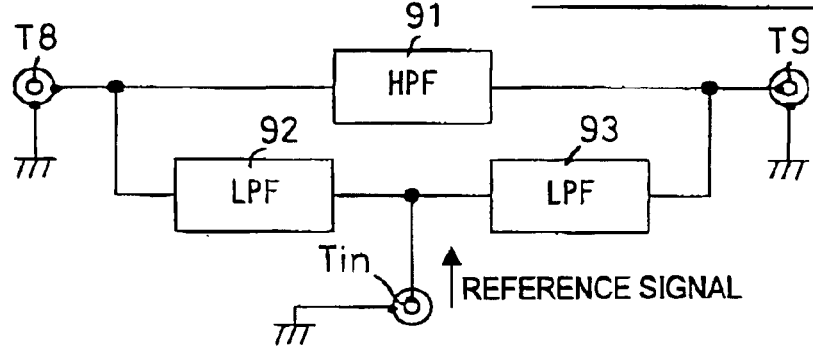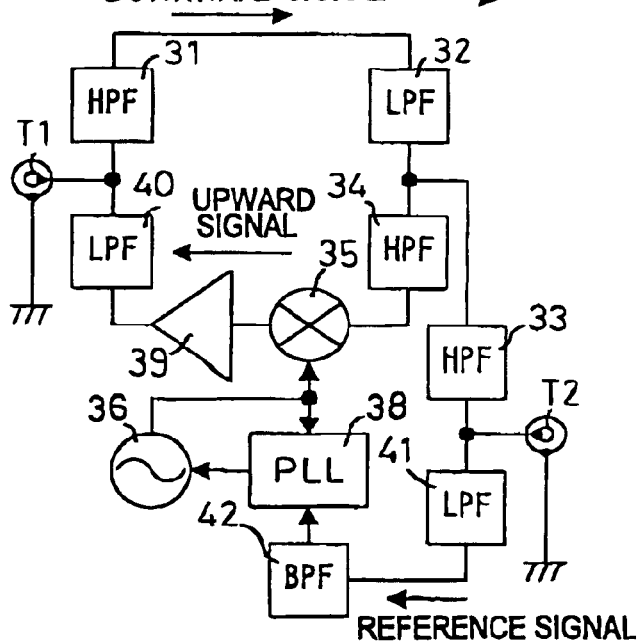

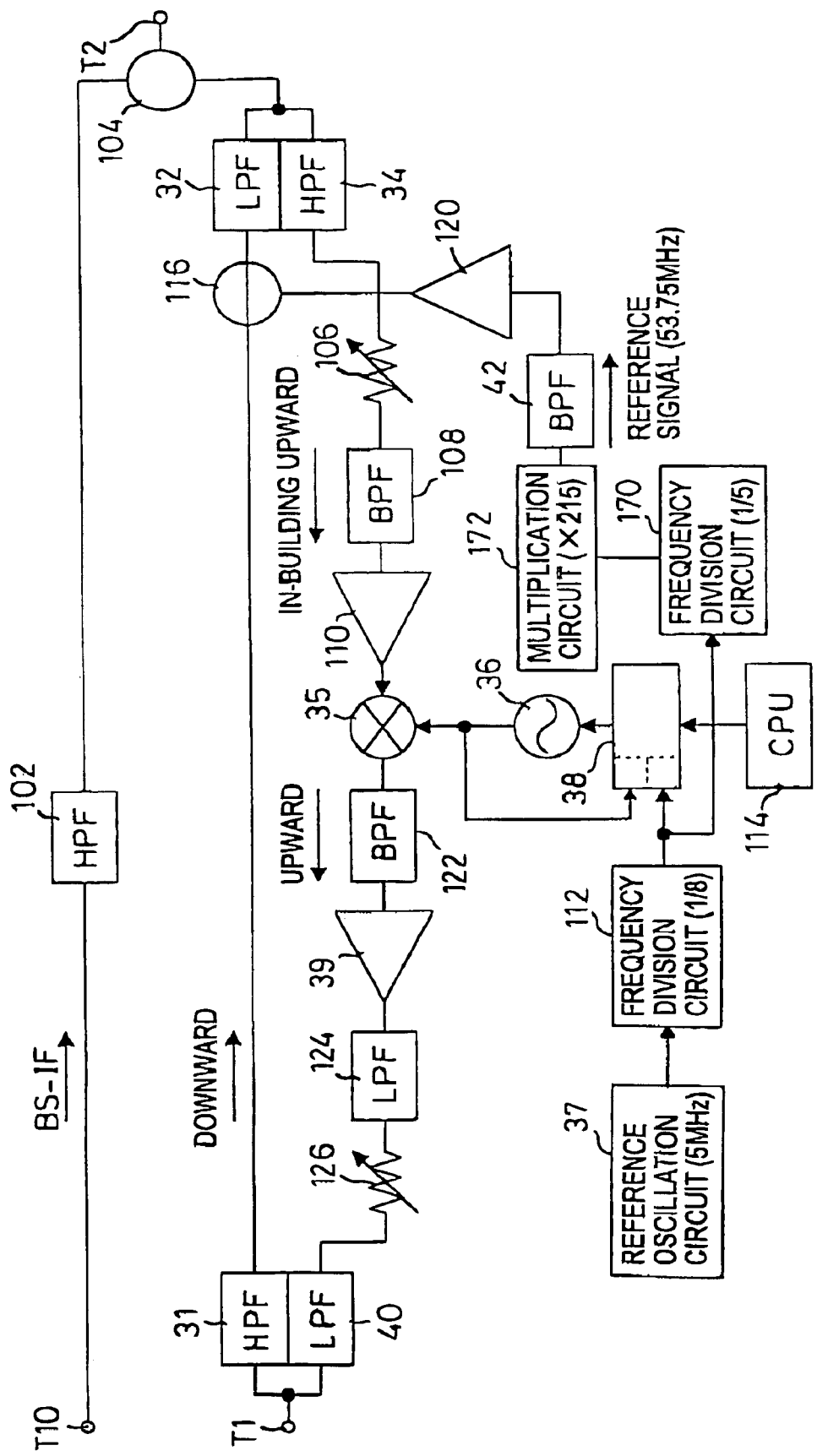

US 7,047,555 B1

IN-BUILDING CATV SYSTEM, DOWN-CONVERTER, UP-CONVERTER AND AMPLIFIER

This is a continuation-in-part of a application Ser. No. 09/507,712 filed Feb. 18, 2000, now U.S. Pat. No. 6,615,407 and entitled "In-Building CATV System, and Up-Converter and Down-Converter for Use therein".

BACKGROUND OF THE INVENTION (i) Field of the Invention

The present invention relates to an in-building CATV system connected to a lead-in wire from an external bi-directional CATV system for transmitting downward signals inputted from the external bi-directional CATV system via an in-building transmission line to plural terminal devices in the building as well as for sending upward signals inputted from each end terminal to the external bi-directional CATV system via the lead-in wire.

(ii) Description of the Related Art

In a conventional known in-building CATV system, noises generated in the building are superimposed to the transmission line via subscriber end terminals and the like, and components of the noises with the same frequency as that of the upward signal are outputted to the external bi-directional CATV system as confluent noises together with the upward signal.

Heretofore, in order to decrease the confluent noises, the upward signal generated in the subscriber terminal device such as a cable modem (a signal with a frequency transmittable in the bi-directional CATV system: for example, 5 MHz–42 MHz) is frequency-converted to an upward signal (hereinafter referred to as an in-building upward signal) with a UHF band (for example, 913 MHz–950 MHz) which is higher than the original frequency and which does not overlap the frequency of the downward signal (for example, 54 MHz–890 MHz). The in-building upward signal is transmitted to the lead-in wire and is converted to the original frequency (that is, the transmission frequency of the upward signal in the bi-directional CATV system) using a down-converter, just before the upward signal is outputted to the lead-in wire from the in-building transmission line.

As mentioned above, when the upward signal is frequency-converted to the in-building upward signal at the terminal side of the in-building CATV system and the in-building upward signal is frequency-converted to the original upward signal at a connection point between the in-building CATV system and the external bi-directional CATV system, the confluent noises outputted to the external bi-directional CATV system from the in-building CATV system can be decreased. However when the up-converter used for frequency conversion at the terminal side and the down-converter used for frequency conversion at the connection point between the in-building CATV system and the external bi-directional CATV system are designed to frequency-convert using outputs from respective oscillation circuits for exclusive use, a deviation is generated in the frequency of a frequency-conversion reference signal in each oscillation circuit and so in some cases the in-building upward signal can not be converted to the original upward signal generated by the terminal device.

Therefore, in the conventional system, in order to restore the original upward signal from the in-building upward signal correctly in the down-converter, a pilot signal used for adjusting the level of the downward signal in the bi-directional CATV system is used as a reference signal which the up-converter and down-converter use for frequency conversion. Specifically, by constituting the up-converter and the down-converter to frequency-convert respective upward signals using the pilot signal of the bi-directional CATV system as a reference signal, the frequency of the reference signal for each converter is made to coincide with each other and the original upward signal is made to be perfectly restored from the in-building upward signal.

However, as mentioned above, if the up-converter and the down-converter are constituted to use the pilot signal contained in the downward signal as a reference signal for frequency conversion, the up-converter and the down-converter do not correctly operate when transmission of the pilot signal is stopped in the bi-directional CATV system for maintenance, inspection or the like, or when the in-building CATV system is connected to a bi-directional CATV system which does not transmit pilot signals. Therefore, the upward signal generated in the terminal devices of the in-building CATV system can not be transmitted to the center equipment of the bi-directional CATV system.

SUMMARY OF THE INVENTION

Wherefore, an object of the present invention is to provide an in-building CATV system in which an upward signal is frequency-converted to a high frequency in-building signal using an up-converter at the terminal side and the in-building upward signal is frequency converted to the original upward signal using a down-converter at a lead-in wire connected to an external bi-directional CATV system, so that the original upward signal can be restored correctly by the down-converter without using a pilot signal superimposed to a downward signal from the external bi-directional CATV system as a reference signal for frequency conversion.

To attain this and other objects, in an in-building CATV system according to one aspect of the invention, like the above-mentioned conventional in-building CATV system, the downward signal inputted from the external bi-directional CATV system via the lead-in wire is transmitted to plural terminals via transmission lines in a building, the in-building upward signal inputted to the terminals via the up-converter is transmitted to the lead-in wire from the external bi-directional CATV system via the transmission line in the building. Moreover, the upward signal frequency-converted from the in-building upward signal to the upward signal with the original frequency outputted from the terminal using the down-converter provided between the lead-in wire and the transmission line in the building is designed to be transmitted to the external bi-directional CATV system from the lead-in wire.

In the in-building CATV system of the present invention, in order to frequency-convert the in-building upward signal correctly to the original upward signal, a reference signal with a constant frequency different from those of various transmission signals flowing through the transmission lines in the system upward and downward (bi-directionally) is generated by a reference signal generating means and the reference signal is transmitted to the transmission line in the building by a reference signal transmission means.

Therefore, according to the in-building CATV system of the present invention, even when the pilot signal is not superimposed to the downward signal inputted from the external bi-directional CATV system, it becomes possible that the down-converter and the up-converter frequency-convert the in-building upward signal and the upward signal respectively using a common reference signal and the down-converter restores the original upward signal inputted to the up-converter from the terminal device.

Especially in the present invention, since the frequency of the reference signal generated by a reference signal generating means is set to a frequency different from those of various transmission signals flowing bi-directionally through the transmission line in the system, characteristic of the transmission signals transmitted bi-directionally in the system is not deteriorated by the influence of the reference signal and so the transmission quality of the upward and downward signals can be secured.

When the reference signal for frequency conversion is taken out by the down-converter and the up-converter, it is easily taken out by using a band path filter corresponding to the frequency of the reference signal and there is no need for the down-converter and the up-converter to be provided with a complicated circuit. Therefore, the cost of the down-converter and the up-converter can be kept lower compared with the case where the pilot signal contained in the downward signal is used as the reference signal.

Here, the reference signal generating means and the reference signal transmission means can constitute a reference signal superimposing equipment independently from other various transmission equipments which constitute the in-building CATV system, but may be provided in the down-converter.

By such a constitution, the reference signal can be sent to the up-converter at each terminal side from the down-converter and there is no need to connect any reference signal superimposing equipment having a function as the reference signal generating means and the reference signal transmission means to the in-building transmission line, thereby the cost of construction of the in-building CATV system of the present invention being decreased.

On the other hand, the frequency of the reference signal transmitted to the transmission line by the reference signal transmission means may be a frequency which does not overlap the frequencies of various transmission signals flowing bi-directionally through the transmission lines in the system. For example, it may be set to a frequency in the frequency band between the transmission frequency band of the downward signal previously set in the system and the transmission frequency band of the in-building upward signal or to a frequency in the frequency band much higher than the transmission frequency band of the in-building upward signal.

However, if the frequency of the reference signal is set to a frequency in such a frequency band, transmission loss of the reference signal in the transmission line becomes high and the reference signal occasionally fails to be effectively transmitted to the down-converter and many up-converters provided at the terminal sides. Therefore, the frequency of the reference signal transmitted to the transmission line by the reference signal transmission means may be set to a frequency which is in the frequency band set as the transmission frequency band of the downward signal in the system and which does not overlap the downward signal or to a frequency lower than those of various transmission signals flowing bi-directionally through the transmission lines.

Specifically, when the frequency of the reference signal flowing through the transmission line is set to a frequency in the transmission frequency band of the downward signal, the reference signal is amplified together with the downward signal when being passed through an amplifier provided on the transmission line. Therefore, the reference signal can be transmitted with an adequate level without being provided with an amplifier for exclusive use to fill up the transmission loss.

Moreover, when the frequency of the reference signal flowing through the transmission line is set to a frequency lower than the frequencies of other transmission signals (the downward and upward signals), the transmission loss of the reference signal on the transmission line becomes small and so the reference signal can be effectively transmitted.

In this case, the frequency of the reference signal may be set to a frequency in the transmission frequency band of the downward signal or to a frequency much lower than the transmission frequency band of the downward signal. In particular, when the frequency of the reference signal is set to a frequency in the transmission frequency band of the downward signal, the reference signal is amplified together with the downward signal using an amplifier provided on the transmission line, so that the reference signal can be transmitted more effectively.

In the in-building CATV system of the present invention, the upward signal outputted from a terminal device is once frequency-converted to the high frequency in-building upward signal by the up-converter and is transmitted to the lead-in wire via the transmission line in the system, to prevent noises generated in the building from being transmitted to the external bi-directional CATV system together with the upward signal. But if the signal that can be passed through the transmission line upward is limited only to the in-building upward signal, the subscriber of the system at the terminal side has to have an up-converter in order to communicate with the center equipment of the external bi-directional CATV system, thereby service to the subscriber being aggravated.

Therefore, the up-converter of the present invention is preferably constituted so that the low frequency upward signal outputted from the terminal device which is not frequency-converted by the up-converter can be transmitted directly to the lead-in wire. And when the in-building CATV system is constituted in such a way, since the high frequency in-building upward signal and the low frequency upward signal can be transmitted upward together, even the subscriber who has no up-converter can communicate with the center equipment of the external bi-directional CATV system and therefore communication service in the system is enhanced.

When the in-building upward signal and the upward signal are designed to be transmitted together in such a way, for example, like the Internet which uses the CATV system, high speed data transmission is carried out. For the communications that need high transmission quality like the Internet, the upward signal may be frequency-converted using the up-converter and the down-converter. On the other hand, for example, in the case of the data transmission of automatic meter reading where read data of consumption of gas and electricity is transmitted to the center equipment, the user does not feel inconvenience even if the data is to be retransmitted in response to the demand from the center equipment when error of the data transmission occurs. In such communications, the upward signal from the terminal device may be transmitted directly without frequency conversion.

However, when such communications are carried out, it is necessary that the frequency of the upward signal transmitted using the up-converter and the down-converter and that of the upward signal directly transmitted without using the up-converter and the down-converter are set to different frequencies from each other.

Specifically, in the in-building CATV system, when the upward signal is directly transmitted, since the noise component of the frequency of the upward signal is directly sent to the external bi-directional CATV system, the up-converter and the down-converter can not work effectively if the frequency of this upward signal is set to the same frequency as that of the upward signal transmitted using the up-converter and the down-converter.

Therefore, as mentioned above, in the in-building CATV system, in order to transmit the in-building upward signal and the upward signal together, the frequency of the upward signal which is frequency-converted to the in-building upward signal and the frequency of the upward signal which is directly transmitted to the transmission line without being frequency-converted should be set to frequencies different from each other.

When the frequencies of the upward signals are set to different frequencies, the frequency of the upward signal which is not frequent-converted and transmitted directly to the transmission line may be set to a value higher than that of the upward signal which is frequency-converted to the in-building upward signal.

Specifically, since the frequency of the noises generated in the building is relatively low, the noises with the same frequency as that of the upward signal is prevented from being sent to the external bi-directional CATV system, when the frequency of the upward signal which is not frequency-converted and is directly sent to the transmission line is set to a high frequency, as mentioned above.

Subsequently, the down-converter used in the in-building CATV system is for frequency-converting the in-building upward signal to the original upward signal using the reference signal with a constant frequency transmitted to the transmission line from a reference signal transmission means. In the down-converter, the downward signal inputted from the external bi-directional CATV system via the lead-in wire is transmitted to the transmission line in the building via a first downward signal path.

In the down-converter, a first reference signal extracting means extracts the reference signal with a constant frequency transmitted from the reference signal transmission means among upward transmission signals inputted via the transmission line, a first frequency conversion means takes out the in-building upward signal outputted from the up-converter at the terminal side among the upward transmission signals inputted via the transmission line and, the in-building upward signal is frequency-converted to the original upward signal using the reference signal extracted by the first reference signal extracting means and the frequency-converted upward signal is transmitted to the lead-in wire.

As a result, according to the down-converter, the downward signal inputted from the external bi-directional CATV system via the lead-in wire can be transmitted to the terminal side, the in-building upward signal transmitted from the terminal side via the up-converter can be frequency-converted to the upward signal with the original frequency and sent to the external bi-directional CATV system.

In such a down-converter, there may be provided with a first determining means for determining whether the reference signal can be extracted by the first signal extracting means or not. When it is determined by the first determining means that the reference signal can not be extracted, a specific transmission signal with a fixed frequency (for example, above-mentioned pilot signal and the like) is extracted among the downward signals flowing through the first downward signal path and the specific transmission signal may be transmitted to a first frequency conversion means as the reference signal by a first specific transmission signal extracting means.

Specifically, if the down-converter is constituted in such a way, the in building upward signal can be frequency-converted using the specific transmission signal such as the pilot signal contained in the downward signal, when the reference signal transmission means and the reference signal generating means provided on the transmission line are not normally working.

When the down-converter is constituted in such a way, the up-converter provided at the terminal side may also be constituted such that the upward signal can be frequency-converted to the in-building upward signal using the specific transmission signal such as the pilot signal contained in the downward signal.

Subsequently, the down-converter may be provided with a downward signal amplification means for amplifying the downward signal passed through the path in the first downward signal path and be provided in an input path of the in-building upward signal to the first frequency conversion means or in an output path of the upward signal from the first frequency conversion means with an upward signal amplification means for amplifying the in-building upward signal or the upward signal passed through the path.

According to such a down-converter, the downward signal and the upward signal passed through the down-converter can be amplified respectively. Therefore, the down-converter has a function as an amplification equipment and so the amplification equipment which is usually used in the in-building CATV system for amplifying the transmission signals becomes unnecessary.

Therefore, by using the down-converter, the transmission devices (specifically, amplifiers) for constituting the in-building CATV system can be decreased and the construction cost of the in-building CATV system can be lowered.

On the other hand, the up-converter used in the in-building CATV system of the present invention is for frequency-converting the upward signal outputted from the terminal device to the in-building upward signal and for transmitting the frequency-converted in-building upward signal to the transmission line via the terminal. In the up-converter, the downward signal transmitted to the terminal via the transmission line is transmitted to the terminal device via a second downward signal path.

Also in the up-converter, a second signal extracting means extracts the reference signal with a constant frequency transmitted from the reference signal transmission means among the downward transmission signals transmitted to the terminal via the transmission line, a second frequency conversion means frequency-converts the upward signal outputted from the terminal device to the in-building upward signal using the reference signal extracted by the second reference signal extracting means and the frequency-converted in-building upward signal is transmitted to the transmission line of the in-building CATV system via the terminal.

On the other hand, an amplifier used in the in-building CATV system of the present invention is provided on the transmission line of the in-building CATV system and used for amplifying the transmission signal flowing through the transmission line.

In the amplifier, a third downward signal path for sending the downward signal sent from the down-converter via the transmission line to the terminal side and an in-building upward signal path for sending the in-building upward signal sent from the terminal side via the transmission line to the down-converter are formed. The downward signal and the in-building upward signal are amplified respectively by a downward amplification means and an in-building upward signal amplification means provided on these signal paths respectively.

In the amplifier, in addition to the above-mentioned paths, there is formed a first reference signal path for connecting the transmission line at the down-converter side and the transmission line at the terminal side, so that the reference signal can be passed through it.

In order to constitute the in-building CATV system, since the reference signal is necessary to be transmitted not only to the down-converter and the up-converter connected to the input/output terminals of the amplifier via the transmission line but also to the up-converter connected to the branch terminal via the transmission line, in the amplifier, there is formed a second reference signal path for connecting the branch terminal and the reference signal path so that the reference signal can be passed through it.

As a result, the amplifier has a function as a branch amplifier that can not only amplify upward and downward signals bi-directionally, but also can transmit the reference signal to all the converters connected to the transmission lines in the in-building CATV system, and becomes the most suitable branch amplifier for constituting the in-building CATV system of the present invention.

BRIEF DESCRIPTION OF THE DRAWINGS

Embodiment of the present invention will be described hereinafter with reference to the drawings, in which:

FIGS. 4A, 4B and 4C are explanatory drawings for an in-building CATV system in which a reference signal is transmitted to a transmission line using a signal inserting device;

FIG. 12 is a block diagram showing a modified example of the down-converter shown in FIG. 10.

DETAILED DESCRIPTION OF PREFERRED EMBODIMENTS

First Embodiment

Figure 1:
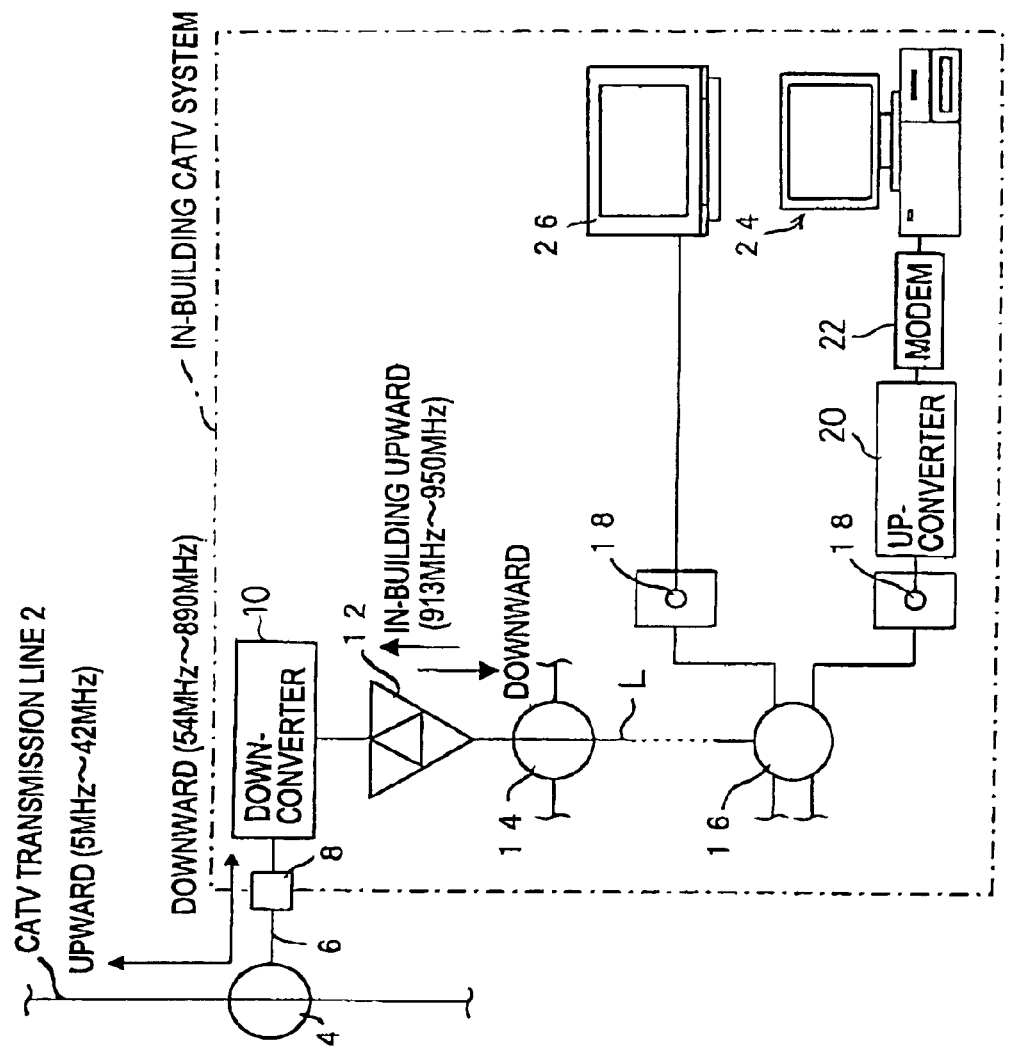
FIG. 1 is a schematic view showing an in-building CATV system of the first embodiment of the present invention.

As shown in FIG. 1, the in-building CATV system of the present embodiment is connected to a lead-in wire 6 branched via a tap unit 4 from a transmission line (CATV transmission line) 2 of an external bi-directional CATV system via a protector 8. A downward signal of the bi-directional CATV system with a frequency of 54 to 890 MHz inputted from the lead-in wire 6 is transmitted to a number of terminals 18 provided in subscriber's houses in a building and consisting of serial units and the like, via a transmission line L made of a coaxial cable in the building, bi-directional amplifiers 12, directional couplers 14, splitters 16 disposed on the transmission line L. Additionally, an in-building upward signal inputted to the terminal 18 via an up-converter 20 described hereinafter is transmitted to the lead-in wire 6. The bi-directional coupler 12 corresponds to an amplifier of the present invention.

Moreover, in the in-building CATV system of the present embodiment, when the subscriber enjoys the Internet via a center equipment of the external bi-directional CATV system or data for reserving a pay program, television shopping and the like are to be transmitted to the center equipment, an information terminal device 24 such as a personal computer is connected to the terminal 18 via the up-converter 20 and a cable modem 22.

As a result, a transmission data for data communication outputted from the information terminal 24 is converted to an upward signal with a predetermined frequency (in the present embodiment, 5 MHz–42 MHz) transmittable in the external bi-directional CATV system by the cable modem 22 and the upward signal is further frequency-converted to an in-building upward signal with a predetermined frequency (in the present embodiment, 913 MHz–950 MHz) by the up-converter 20 to be inputted to the terminal 18.

Therefore, a down-converter 10 is provided at a connection portion of the transmission line L of the in-building CATV system and the lead-in wire 6 from the external bi-directional CATV system to frequency-convert the in-building upward signal from each terminal 18 via the transmission line L to the original upward signal transmittable in the external bi-directional CATV system.

In FIG. 1, a device 26 is a television receiver connected to the terminal 18 without any connected up-converter 20 (or to an output terminal for the downward signal provided in an up-converter 20) for receiving the downward signal transmitted from the external bi-directional CATV system via the transmission line L to demodulate and regenerate television broadcasting of a desired channel.

Subsequently, the constitution of each of the down-converter 10, bi-directional amplifier 12 and up-converter 20 will be described using FIG. 2.

[Down-Converter]

Figure 2:
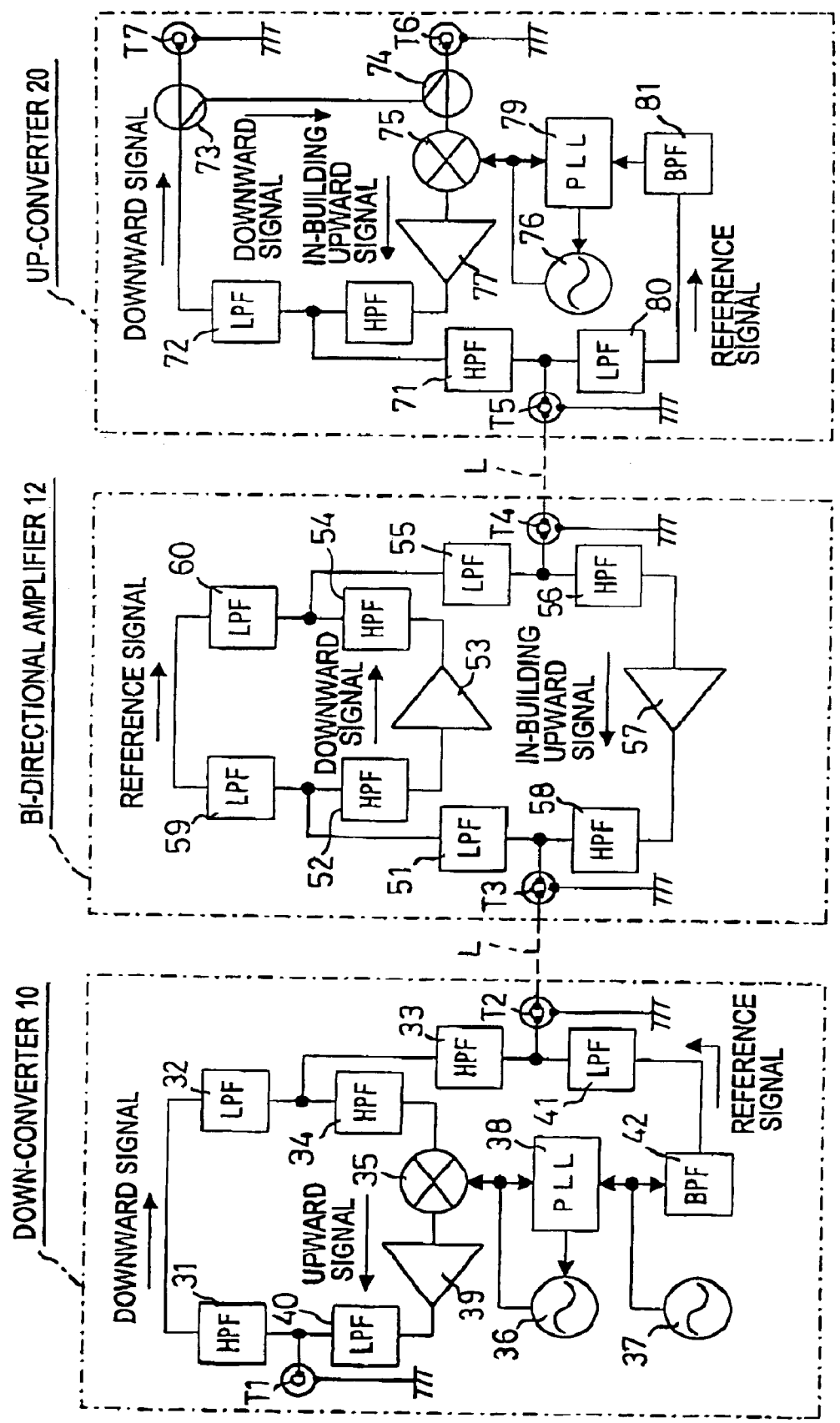
FIG. 2 is a block diagram showing a down-converter, a bi-directional amplifier and an up-converter used in the system of FIG. 1.

As shown in FIG. 2, the down-converter 10 is provided with an external connection terminal T1 for connecting the lead-in wire 6 from the external bi-directional CATV system and an internal connection terminal T2 for connecting the transmission line L in the building.

The downward signal inputted to the external connection terminal T1 is taken into the down-converter 10 via an HPF (high path filter) 31 and transmitted to the transmission line L of the terminal side via an LPF (low path filter) 32, HPF 33 and the internal connection terminal T2.

The HPF 31 passes the downward signal and cuts off the frequency-converted upward signal. The cut-off frequency is set, for example, to 54 MHz. The LPF 32 also passes the downward signal and cuts off the in-building upward signal before frequency conversion. The cut-off frequency is set, for example, to 890 MHz. The HPF 33 cuts off a reference signal mentioned hereinafter whose frequency is lower than that of the downward signal. Its cut off frequency is set, for example, 54 MHz. Therefore, in the down-converter 10 of the present embodiment, a first downward signal path of the present invention is formed by the HPF 31, LPF 32 and HPF 33.

Subsequently, the in-building upward signal from the terminal side inputted to the internal connection terminal T2 is taken into the up-converter 20 via the HPF 33 and an HPF 34. The HPF 34 prevents the downward signal outputted by the LPF 32 from turning around and selectively takes in only the in-building upward signal. Its cutoff frequency is set, for example, to 913 MHz. Then, the in-building upward signal taken into the down-converter 10 via the HPF 34 is inputted to a mixer 35 for frequency-conversion.

The mixer 35 receives a signal (a high frequency signal for frequency conversion) from a local oscillation circuit 36 of a frequency-variable type whose oscillation frequency is controlled to a constant value (for example, 955 MHz) by a PLL circuit 38 and converts the in-building upward signal to the upward signal for the bi-directional CATV system. The upward signal whose frequency has been converted by the mixer 35 is transmitted to the lead-in wire 6 via an LPF 40 and the external connection terminal T1 after having been amplified to a predetermined level by an amplifier 39 as an upward signal amplification means. The LPF 40 cuts off the downward signal inputted to the external connection terminal T1 and passes only the frequency-converted upward signal. Its cutoff frequency is set, for example, to 42 MHz.

On the other hand, the PLL circuit 38 controls the oscillation frequency of the local oscillation circuit 36 so that the phase of the high frequency signal for frequency conversion outputted from the local oscillation circuit 36 coincides with that of the reference signal. In the present embodiment, the reference signal used for controlling the oscillation frequency of the local oscillation circuit 36 by the PLL circuit 38 is designed to be generated by the reference oscillation circuit 37 in the down-converter 10. The reference oscillation circuit 37 functions as a reference signal generating means.

The reference oscillation circuit 37 generates the reference signal with a constant frequency (lower than 54 MHz) lower than the transmission frequency band of the downward signal. The PLL circuit 38 frequency-divides the reference signal and an output signal from the local oscillation circuit 36, generates a control signal for making the phases of these frequency-divided signals coincide with each other and outputs the control signal to the local oscillation circuit 36 to control the frequency of the output signal from the local oscillation circuit 36 to a constant frequency (955 MHz) corresponding to the reference signal.

In order to transmit the reference signal generated by the reference oscillation circuit 37 from the internal connection terminal T2 to the transmission line L, not only the PLL circuit 38 but also a band path filter (referred to as BPF, hereinafter) 42 with a narrow frequency band for passing only the reference signal are provided on the output terminal of the reference signal circuit 37. The reference signal passed through the BPF 42 is transmitted to the transmission line L via an LPF 41 and the internal connection terminal T2.

The cutoff frequency of the LPF 41 is set, for example, to 54 MHz. The in-building upward signal inputted to the internal connection terminal T2 via the transmission line L and the downward signal transmitted to the transmission line L from the HPF 33 via the internal connection terminal T2 are prevented from turning around the BPF 42 side. And in the present embodiment, the LPF 41 and the BPF 42 function as a reference signal transmission means of the present invention. In the down-converter 10, the local oscillation circuit 36, PLL circuit 38 and mixer 35 provided for frequency-converting the in-building upward signal to the upward signal using the reference signal function as a first frequency conversion means of the present invention.

[Bi-Directional Amplifier]

As shown in FIG. 2, the bi-directional amplifier 12 is provided with an input terminal T3 connected to the internal connection terminal T2 of the down-converter 10 via the transmission line L and an output terminal T4 for connecting to the transmission line L at the terminal side farther than the bi-directional amplifier 12 itself.

The downward signal and the reference signal inputted to the input terminal T3 from the internal connection terminal T2 in the down-converter 10 via the transmission line L are taken into the bi-directional amplifier 12 via an LPF 51.

Among these signals, the downward signal is inputted to an amplification circuit 53 as a downward signal amplification means via an HPF 52, amplified to a predetermined level in the amplifier 53 and then transmitted to the transmission line L of the terminal side via an HPF 54, an LPF 55 and the output terminal T4, while the reference signal is transmitted to the transmission line L of the terminal side via an LPF 59, an LPF 60, the LPF 55 and the output terminal T4.

Here, the LPF 51 connected to the input terminal T3 prevents the in-building upward signal as well as the downward signal and the reference signal from turning around the output terminal T4 side and passes only the downward signal and the reference signal inputted to the input terminal T3 from the down-converter 10. Its cut-off frequency is set, for example, to 890 MHz.

Moreover, the HPF 52 and HPF 54, as a third reference signal path of the present invention, provided in front of and behind the amplification circuit 53, respectively, prevent the reference signal from being passed and pass only the downward signal. The cut-off frequency is set, for example, to 54 MHz.

Further, the LPF 59 and LPF 60 cut off the downward signal and pass only the reference signal, as a first reference signal path of the present invention. Its cut-off frequency is set, for example, to 54 MHz.

Furthermore, the LPF 55 connected to the output terminal T4 prevents the in-building upward signal inputted to the output terminal T4 from the transmission line L of the terminal side from turning around the amplification circuit 53 via the HPF 54 and passes the downward signal and the reference signal which were passed through the HPF 54 and LPF 60. Its cut-off frequency is set, for example, to 890 MHz.

Subsequently, the in-building upward signal inputted to the output terminal T4 from the transmission line L of the terminal side is inputted to an amplification circuit 67 as an in-building upward signal amplification means via an HPF 56, amplified to a predetermined level by the amplification circuit 57 and then transmitted to the transmission line L of the down-converter 10 side via an HPF 58 and the input terminal T3.

Furthermore, the HPF 56 and HPF 58 in front of and behind the amplification circuit 57, respectively, prevent the downward signal and the reference signal from invading the amplification circuit 57 and pass only the in-building upward signal, thereby forming an in-building upward signal path of the present invention.

[Up-Converter]

As shown in FIG. 2, an up-converter 20 is provided with a first connection terminal T5 for connecting to a terminal 18 via a coaxial cable and the like, a second connection terminal T6 for connecting to a terminal device for communication such as a cable modem 22 for outputting the upward signal, and a third connection terminal T7 for connecting to a terminal device for reproduction such as a television receiver 26.

The downward signal inputted to the first connection terminal T5 from the terminal 18 is taken into the up-converter 20 via a HPF 71 and outputted to a terminal device for reproduction such as the television receiver 26 via a LPF 72 and the third connection terminal T7. On the downward signal path from the LPF 72 to the third connection terminal T7, there is provided a branch circuit 73 consisting of a directional coupler for branching a part of the downward signal. The downward signal branched by the branch circuit 73 is led to the second connection terminal T6 via a mixing circuit 74 consisting of a directional coupler and outputted to a terminal device for communication such as the cable modem 22.

The HPF 71 cuts off the reference signal inputted to the first connection terminal T5 from the end terminal 18 and passes the downward signal and the frequency-converted in-building upward signal. Its cutoff frequency is set, for example, to 64 MHz. Furthermore, the LPF 72 cuts off the frequency-converted in-building upward signal and passes only the downward signal inputted to the first connection terminal T5. Its cutoff frequency is set, for example, to 890 MHz. Therefore, in the up-converter 20 of the present embodiment there are formed two second downward signal path of the present invention by the HPF 71, LPF 72, branch circuit 73 and mixing circuit 74.

The upward signal inputted to a second connection terminal T6 from the terminal device for communication such as a cable modem 22 and the like is inputted to a mixer 75 for frequency conversion via the mixing circuit 74. The mixer 75 receives a signal from a local oscillation circuit 76 of a frequency variable type whose oscillation frequency is controlled to a constant value (for example, 955 MHz) by the PLL circuit 79.

The in-building upward signal frequency-converted by the mixer 75 is transmitted to the terminal 18 via an HPF 78, the HPF 71 and the first connection terminal T5, after having been amplified to a predetermined level by an amplifier 77 as an in-building upward signal amplification means. The HPF 78 cuts off the downward signal inputted to the first connection terminal T5 and passes only the frequency-converted in-building upward signal. Its cutoff signal is set, for example, to 913 MHz.

On the other hand, the PLL circuit 79 controls the oscillation frequency of the local oscillation circuit 76 so that the phase of a signal for frequency conversion and that of the reference signal coincide with each other. The reference signal is generated in the reference oscillation circuit 37 in the down-converter 10 and transmitted to the subscriber terminal 18 via various transmission devices like the transmission line L and bi-directional amplifier 12.

Therefore, the up-converter 20 is provided with an LPF 80 and a BPF 81 as a second reference signal extracting means for selectively taking in the reference signal inputted to the first connection terminal T5 via the terminal 18 and the reference signal extracted by the filters (LPF80 and BPF 81) is inputted to the PLL circuit 79 as a reference signal for frequency conversion.

The LPF 80 cuts off the downward signal and the frequency-converted in-building upward signal and takes in the reference signal inputted to the first connection terminal T5. Its cutoff frequency is set, for example, to 54 MHz. The BPF 81 is for inputting only the reference signal to the PLL circuit 79 among signals passed through the LPF 80 and is constituted as a BPF with a narrow band corresponding to the frequency of the reference signal.

The PLL circuit 79, like the PLL circuit 38 provided in the down-converter 10, frequency-divides the reference signal inputted from the BPF 81 and the output signal from the local oscillation circuit 76, generates a control signal for making the phases of these frequency-divided signals coincide with each other and outputs the control signal to the local oscillation circuit 76 to control the frequency of the output signal from the local oscillation circuit 76 to a constant frequency (955 MHz) corresponding to the reference signal. In the up-converter 20 of the present embodiment, the local oscillation circuit 76, PLL circuit 79 and mixer 76 provided for frequency-converting the upward signal to the in-building upward signal using the reference signal function as a second frequency conversion means.

As mentioned above, in the in-building CATV system of the present invention, in order to correctly convert the in-building upward signal frequency-converted in the up-converter 20 to the upward signal in the down-converter 10, the reference oscillation circuit 37 as a reference signal generating means is provided and the reference signal generated by the reference oscillation circuit 37 is transmitted to the subscriber terminal 18 via the transmission line L.

As a result, according to the in-building CATV system of the present embodiment, the reference signal used by the up-converter 20 connected to each terminal 18 for frequency-converting the upward signal outputted from the terminal device for communication such as the cable modem 22 and the reference signal used by the down-converter 10 for frequency-converting the in-building upward signal to the original upward signal are made to coincide with each other. Even when the downward signal does not contain a specific transmission signal (a pilot signal etc.) available as the reference signal, the down-converter 10 can correctly restore the upward signal from the in-building upward signal and send it to the transmission line 2 of the external bi-directional CATV system.

Moreover, since the frequency of the reference signal is not included in the transmission frequency band of the downward signal and the in-building upward signal flowing bi-directionally through the transmission line L, the characteristic of each transmission signal is not deteriorated by the influence of the reference signal and the transmission quality can be secured. Since the frequency of the transmission signal is set to a low frequency than the transmission frequency band, the transmission loss of the reference signal in the transmission line L becomes lower than that of other transmission signals. As a result, it is prevented from occurring that, for example, at the terminal side, the signal level of the reference signal becomes low and an amplifier for amplifying the reference signal becomes necessary.

In the present embodiment, since the function as a reference signal generating means and reference signal transmission means is given to the down-converter 10, there is no need to provide on the transmission line a reference signal superimposing device for generating the reference signal and transmitting it to the transmission line L, and so the construction fee for actually constructing the in-building CATV system can be lowered.

One embodiment of the present invention was described in the above, but the invention is not limited to the above-mentioned embodiment and can be embodied in various way.

For example, in the above embodiment, when the reference signal generated by the reference oscillation circuit 37 is transmitted to the transmission line L, the reference signal is directly transmitted to the transmission line L using the reference signal transmission means comprising the BPF 42 and LPF 41. However, as shown in FIG. 3, a transmission wave generating circuit 43 and modulator 44 are provided in the down-converter 10, a transmission wave generated by the transmission generating means 43 with a frequency (for example, lower than 10 MHz) lower than that of the reference signal is modulated (for example, amplitude modulation) using an output (reference signal) from the reference oscillation circuit 37 and the modulated signal may be transmitted to the transmission line L.

Figure 3:
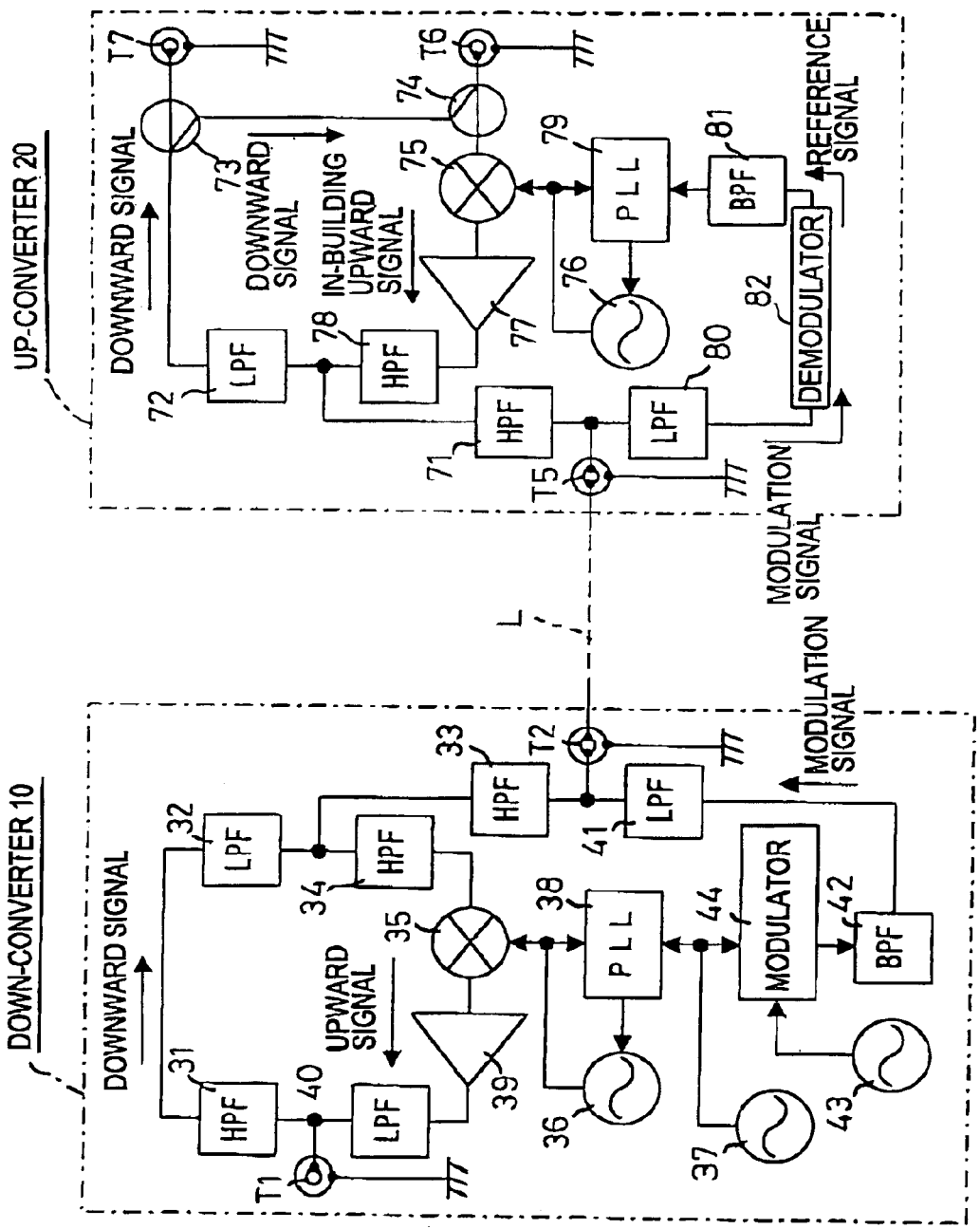
FIG. 3 is a block diagram showing a modified example of a down-converter and an up-converter used in the system of FIG. 1.

In the case, as shown in FIG. 3, the up-converter 20 is provided with a restorer 82 for restoring the reference signal from the modulated signal of the reference signal passed through the LPF 80 and the reference signal restored by the restorer 82 is inputted to the PLL circuit 79.

By doing in such a way, the reference signal of high quality with high SIN ratio (a ratio of a signal vs. noises) can be restored by the restorer 82, even when the signal level of the modulated signal inputted to the up-converter 20 becomes low because of transmission loss generated when the modulated signal is passed through the transmission line L.

FIG. 3 shows modified examples of the up-converter 10 and the down-converter 20. All constituents except those mentioned above are the same as those shown in FIG. 2 and so the same notations are given to the constituents, thereby explanation being omitted.

Moreover, in the above-mentioned embodiment, the down-converter 10 is provided with the reference oscillation circuit 37 as a reference signal generating means and the LPF 41 and the BPF 42 as a reference signal transmission means. However, such functions as a reference signal generating means and reference signal transmission means may be realized with a reference signal superimposing equipment comprising the reference oscillation circuit 37 and a signal inserting device 28 separated from the down-converter 10, as shown in FIG. 4A.

The signal inserting device 28 realizes the function as the reference signal transmission means. As shown in FIG. 4B, the signal inserting device 28 may be constituted to send the reference signal inputted to a reference signal inputting terminal Tin from the reference oscillation circuit 37 to the transmission lines L of the terminal side and down-converter side, respectively, via, for example, LPFs 92 and 93 with a cutoff frequency of 54 MHz and terminals T8 and T9 for connecting the signal inserting device 28 to the transmission line L in series and to pass the downward signal and the in-building downward signal flowing through the transmission line L via an HPF 91 (the cutoff frequency is set, for example, to 54 MHz) provided between the terminals T8 and T9.

Moreover, when the reference signal superimposing equipment 28 is constituted separately from the down-converter 10, as shown in FIG. 4C, the reference oscillation circuit 37 is omitted from the down-converter 10 shown in FIG. 2 and the reference signal inputted to the internal connection terminal T2 from the transmission line L may be inputted to the PLL circuit 38 via the LPF 41 and BPF 42. In the present case, the LPF 41 and BPF 42 function as the first reference signal extracting means of the present invention.

Figure 5A:
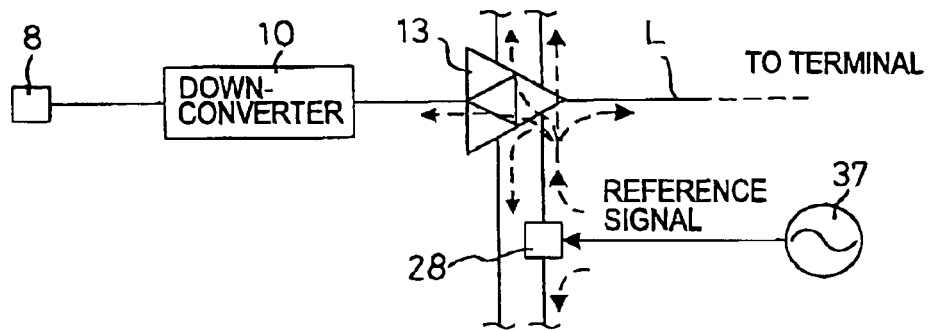
FIGS. 5A and 5B are block diagrams showing the constitution of a branch amplifier used in stead of the bi-directional amplifier shown in FIG. 2.
Figure 5B:
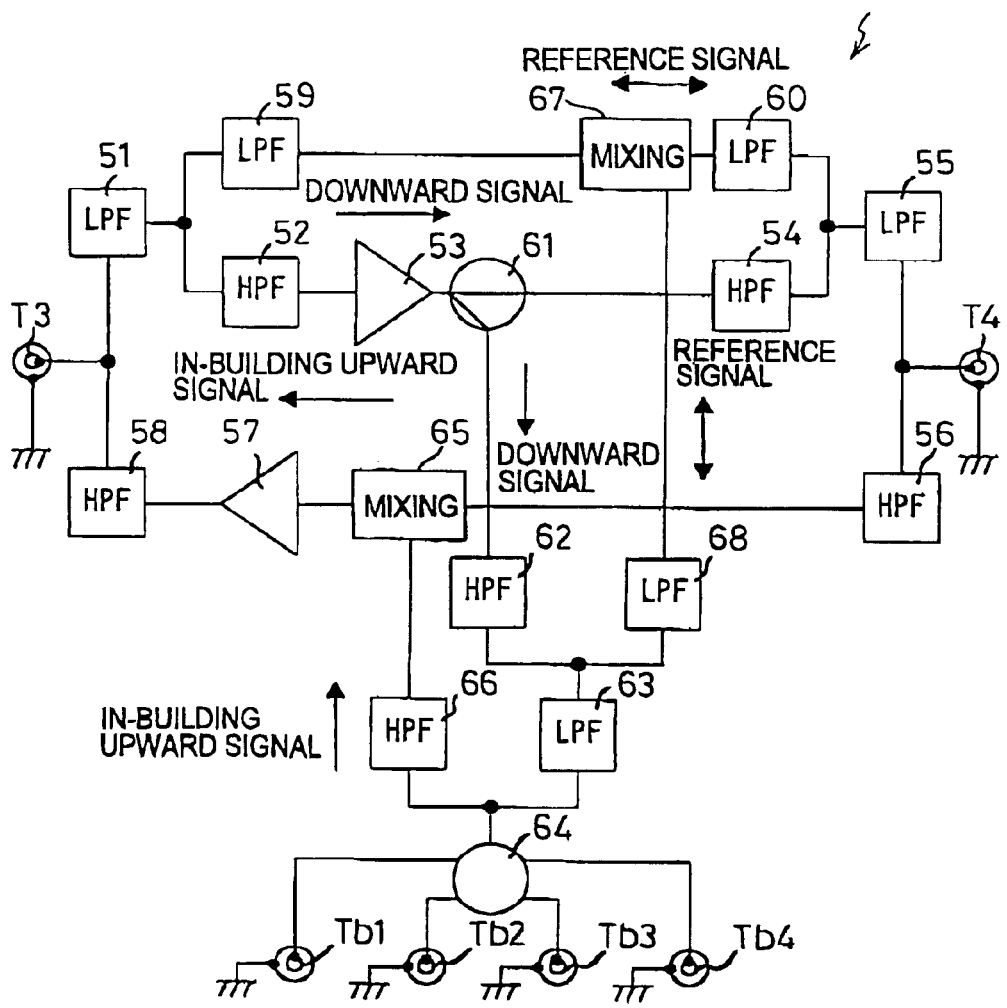

On the other hand, though in the above-mentioned embodiment, the in-building CATV system provided with the bi-directional amplifier 12 on the transmission line L was described, when a in-building CATV system provided with a branch amplifier 13 in stead of the bi-directional amplifier 12, is constituted, the branch amplifier 13 may be constituted as shown in FIG. 5B.

Specifically, the branch amplifier 13 shown in FIG. 5B is provided with four branch terminals Tb1, Tb2, Tb3 and Tb4, in contrast to the bi-directional amplifier 12 shown in FIG. 2. A part of the downward signal amplified in an amplification circuit 53 is branched by a directional coupler 61, the branched downward signal is lead to a splitter 64 via an HPF 62 and an LPF 63 and distributed to four by the splitter 64, and the distributed downward signal is transmitted to the transmission line (branch line) L at the terminal side from each of the branch terminals Tb1–Tb4.

And in the branch amplifier 13, since the in-building upward signal is inputted from the transmission line (branch line) L at the terminal side connected to each of the branch terminals Tb1–Tb4 as well, the in-building upward signal inputted to each of the branch terminals Tb1–Tb4 is taken into the branch amplifier 13 via the splitter 64 and an HPF 66, the taken in-building upward signal is lead to an amplification circuit 57 via a mixing circuit 65 and sent to the transmission line L at the converter 10 side via an HPF 68 and an input terminal T3 after being amplified by the amplification circuit 57.

Moreover, in order to frequency-convert the in-building upward signal inputted to each of the branch terminals Tb1–Tb4 to the original upward signal, it is necessary for the reference signal to be transmitted to the up-converter 20 at the terminal side as well from each of the branch terminals Tb1–Tb4. Therefore, a mixing circuit 67 is provided on the first reference signal path between LPFs 59 and 60 and the reference signal becomes possible to be passed bi-directionally between the first reference signal path and each of the branch terminals Tb1–Tb4, by connecting the first reference signal path to the connection point of the HPF 62 and the LPF 63 via the mixing circuit and an LPF 68.

The HPF 62 cuts off the reference signal and passes the downward signal. Its cutoff frequency is set, for example, to 54 MHz. The LPF 68 cuts off the downward signal and passes the reference signal. Its cut-off frequency is set, for example, to 54 MHz. The LPF 63 cuts off the in-building upward signal and passes the reference signal and the downward signal. Its cutoff frequency is set, for example, to 890 MHz. The HPF 66 cuts of the reference signal and the downward signal and passes the in-building upward signal. Its cutoff frequency is set, for example, to 913 MHz.

In the branch amplifier 13 constituted in such a way, the downward signal inputted to the input terminal T3 from the transmission line L at the converter 10 side is transmitted to the transmission line L at the terminal side from the output terminal T4 and from the branch terminal Tb1–Tb4, respectively, after having been amplified by the amplification circuit 53. And the in-building upward signal inputted to the output terminal T4 or branch terminal Tb1–Tb4 from the transmission line L at the terminal side is transmitted to the transmission line L at the down-converter 10 side from the input terminal T3 after having been amplified by the amplification circuit 57.

The reference signal can be passed not only between the input terminal T5 and the output terminal T4, but also between the input terminal T5 and the branch terminal Tb1–Tb4, and can be passed further between the output terminal T4 and the branch terminal Tb1–Tb4 and between the branch terminals Tb1–Tb4 via the splitter 64.

Therefore, if the branch amplifier 13 is constituted in such a way, all the up-converters 20 and down-converter 10 can be made to frequency-convert the upward signal using the reference signal with the same frequency in the in-building CATV system shown in FIG. 1 where the reference signal is outputted from the down-converter 10 and in the in-building CATV system shown in FIG. 4A where the reference signal is transmitted to the transmission line (branch line) L connected to the input terminal T3 or the output terminal T4 of the amplifier (in FIG. 4A, the bi-directional amplifier 12 without branch terminals) using the signal inserting device 28, as well as in the in-building CATV system shown in FIG. 5A where the signal inserting device 28 is connected to one of the transmission lines (branch lines) L connected to the branch terminals Tb1–Tb4 of the branch amplifier 13 and the reference signal is transmitted to the transmission line (branch line) L.

In the above-mentioned branch amplifier 13, the directional coupler 61, the HPF 62, the LPF 63 and the splitter 64 function as a downward signal branching means of the present invention and the splitter 64, the HPF 66 and the mixing circuit 65 function as an in-building upward signal input means of the present invention.

When the reference signal generated by the reference oscillation circuit 37 is transmitted to the transmission line L via the signal inserting device 28 provided on the transmission line L, as in the case of the in-building CATV system shown in FIG. 4A, the upward signal can not occasionally be transmitted in spite that the down-converter 10 and the up-converter 20 normally operate when the reference oscillation circuit 37 or the signal inserting device 28 is stopped due to a trouble or maintenance.

In such a case, the down-converter 10 and the up-converter 20 may be constituted to detect such happenings, extract the specific transmission signal (signal with a fixed frequency) such as the pilot signal contained in the downward signal from the external bi-directional CATV system and feed it to the PLL circuits 38 and 79, when the reference signal from the reference oscillation circuit 37 can not be received.

In the following, thus constituted down-converter 10 and up-converter 20 will be described, referring to FIGS. 6A and 6B. Since the down-converter 10 and the up-converter 20 shown in FIGS. 6A and 6B are basically the same as the down-converter 10 in FIG. 4C and the up-converter 20 in FIG. 2, respectively, only different points will be described.

Figure 6A:
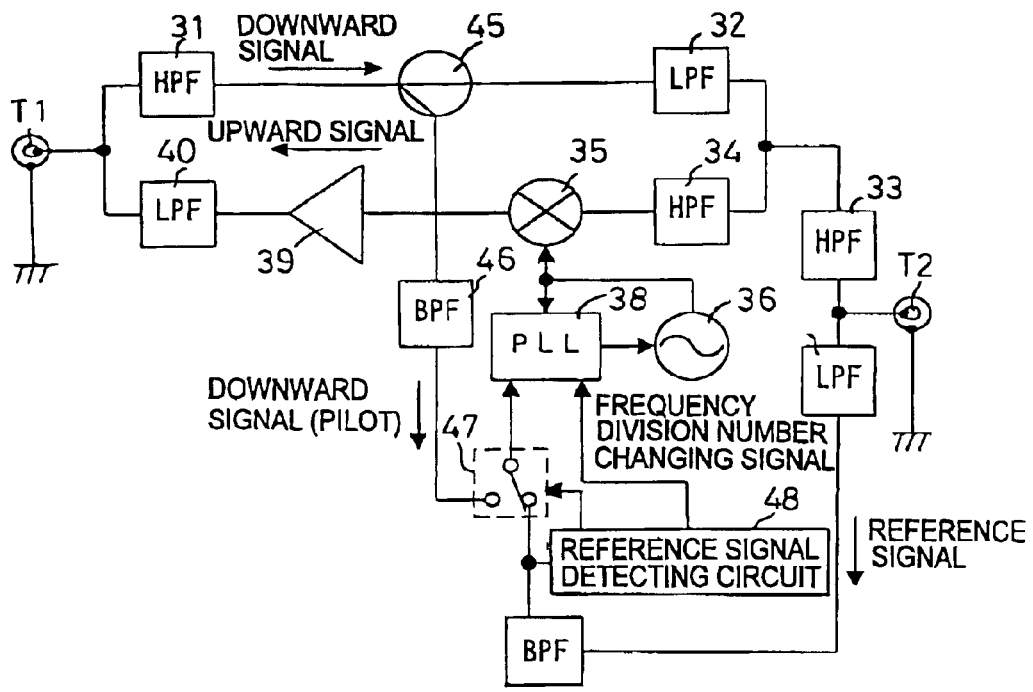
FIGS. 6A and 6B are block diagrams showing a down-converter and an up-converter, respectively, which are constituted to use a pilot signal as a reference signal.
Figure 6B:
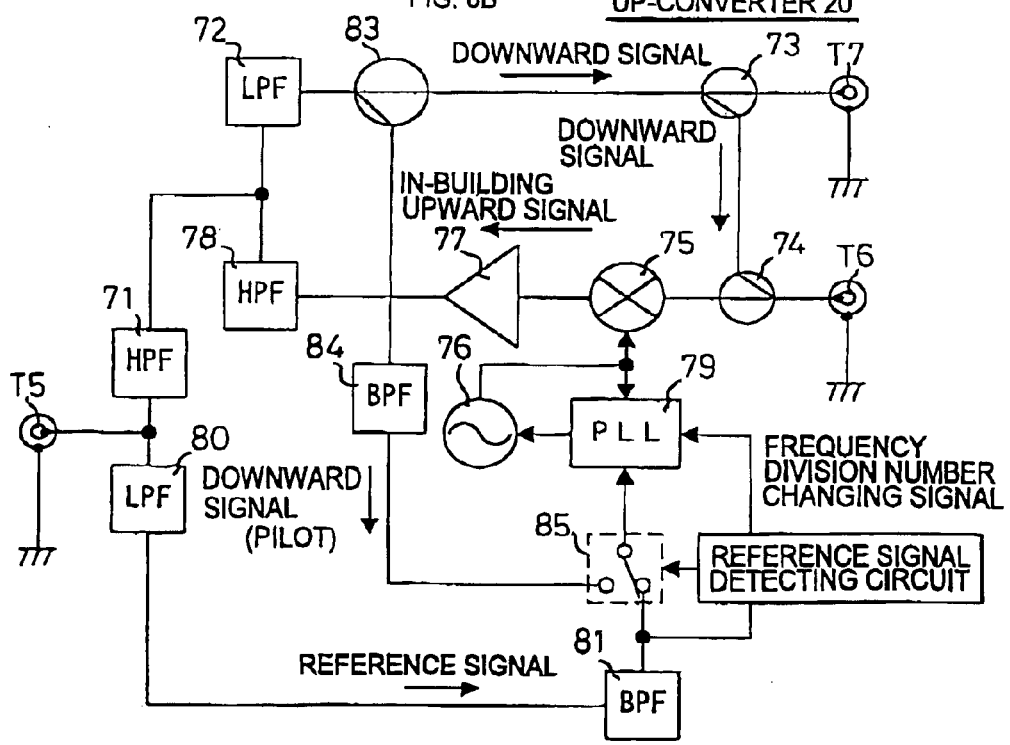

At first, the down-converter in FIG. 6A is provided with a directional coupler 45 in the downward signal path between the HPF 31 and the LPF 32 and may be designed to branch a part of the downward signal, extract the pilot signal with a predetermined frequency (for example, 451.25 MHz) contained in the downward signal via a BPF 46 for extracting signal with a narrow frequency band and input the extracted pilot signal to the PLL circuit 38 via a switch 47.

The switch 47 is for selectively inputting the pilot signal extracted from the downward signal by the BPF 46 or the reference signal extracted by the BPF 42 as a first reference signal extracting means to the PLL circuit 38. The reference signal is usually designed to be inputted to the PLL circuit 38.

The down-converter 10 in FIG. 6A is provided with a reference signal detecting circuit 48 as a first determining means which determines whether the reference signal is outputted from the BPF 42 or not. The reference signal detecting circuit 48 turns the switch 47 to a direction different from the ordinary side (specifically, the side at which the pilot signal extracted by the BPF 46 is inputted to the PLL circuit 38) and inputs the pilot signal to the PLL circuit 38, only when the reference signal is not outputted from the BPF 42.

The reference signal detecting circuit 48 does not only turn the switch 47 but also outputs a frequency division number changing signal for changing a frequency division number used when the PLL circuit 38 takes in an output from the local oscillation circuit 36 or for changing a multiplying number used when the PLL circuit 38 takes in the pilot signal to a predetermined value so that the oscillation frequency of the local oscillation circuit 36 controlled by the PLL circuit 38 becomes the same frequency (for example, 955 MHz) as that of the usual time.

Therefore, according to the down-converter 10 in FIG. 6A, when the reference signal is not transmitted to the transmission line L from the signal inserting circuit 28, the in-building upward signal can be frequency-converted to the original downward signal using the pilot signal contained in the downward signal. In the down-converter 10 of FIG. 6A, the directional coupler 45, the BPF 46 and the switch 47 function as a first specific transmission signal extracting means.

On the other hand, the up-converter 20 shown in FIG. 6B is provided with a directional coupler 83 in the downward signal path between the LPF 72 and the third connection terminal T7, branches a part of the downward signal, extracts the pilot signal contained in the downward signal via a BPF 84 for extracting signal with a narrow frequency band and inputs the extracted pilot signal to a PLL circuit 79 via a switch 85.

The switch 85 selectively inputs the pilot signal extracted by the BPF 84 from the downward signal or the reference signal extracted by the BPF 81 as a second reference signal extracting means to the PLL circuit 79 and usually inputs the reference signal to the PLL circuit 79, like the switch 47 on the down-converter 10.

The up-converter 20 shown in FIG. 6B is provided with a reference signal detecting circuit 86 as a second determining means for determining whether the reference signal is outputted from the BPF 81 or not. The reference signal detecting circuit 86 turns the switch 85 to a direction different from the usual side (specifically, the side at which the pilot signal extracted by the BPF 84 is inputted to the PLL circuit 79), only when the reference signal is not outputted from the BPF 81 and inputs the pilot signal to the PLL circuit 79.

The reference signal detecting circuit 86 does not only turn the switch 85 but also outputs a frequency division number changing signal for changing a frequency division number used when the PLL circuit 79 takes in an output from the local oscillation circuit 76 or for changing a multiplying number used when the PLL circuit 79 takes in the pilot signal to a predetermined value so that the oscillation frequency of the local oscillation circuit 76 controlled by the PLL circuit 79 becomes the same frequency (for example, 955 MHz) as that of the usual time.

Therefore, according to the up-converter 20 in FIG. 6B, when the reference signal is not transmitted to the transmission line L from the signal inserting circuit 28, the upward signal can be frequency-converted to the in-building upward signal using the pilot signal contained in the downward signal, like the down-converter 10. In the up-converter 20 of FIG. 6B, the directional coupler 83, the BPF 84 and the switch 85 function as a second specific transmission signal extracting means.

When the in-building CATV system is constituted using the down-converter 10 in FIG. 6A and the up-converter 20 in FIG. 6B, since the down-converter 10 and the up-converter 20 can frequency-convert the upward signal using the common pilot signal contained in the downward signal on the failure and temporary stop of the reference oscillation circuit 37 and the signal inserting circuit 28, the probability that the upward signal can not be transmitted can be lowered.

Figure 7:
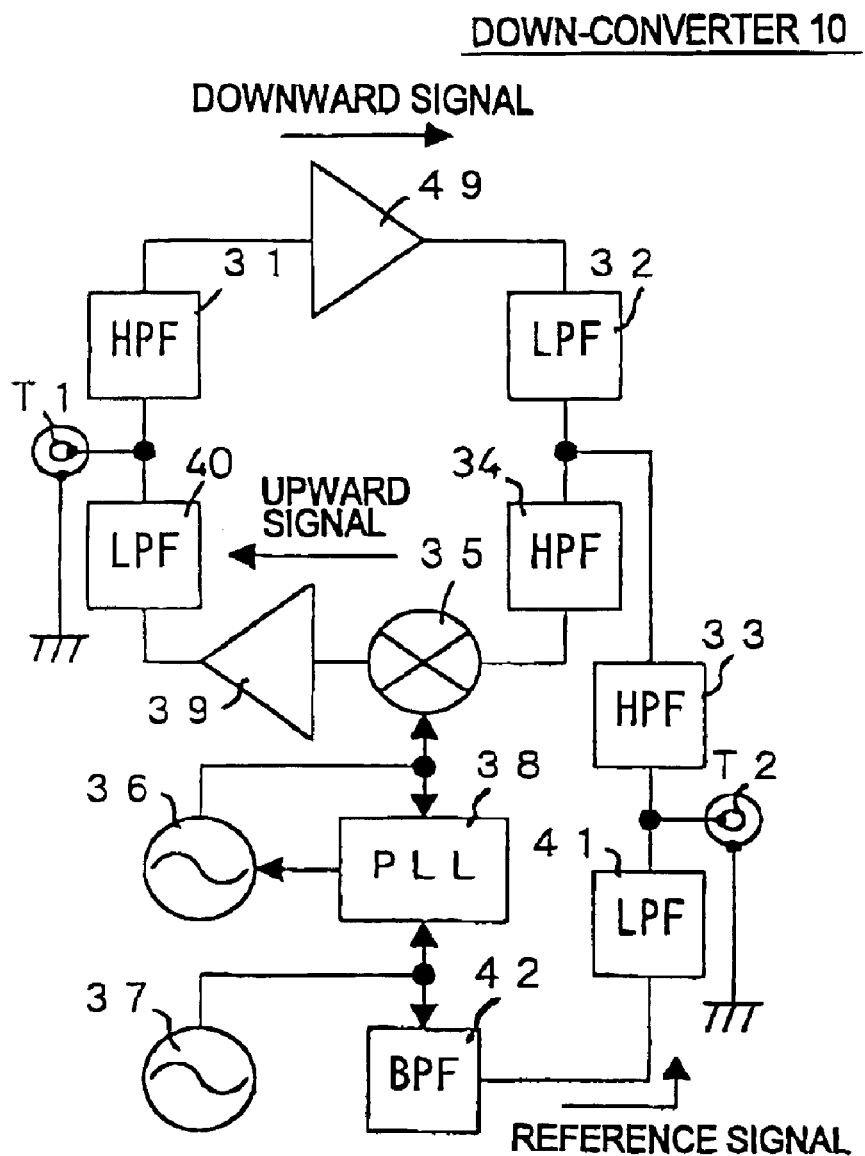
FIG. 7 is a block diagram showing the constitution of a down-converter provided with an amplification circuit for a downward signal.

Moreover, an amplification circuit 49 as a downward signal amplification means may be provided, for example, on the downward signal path between the HPF 31 and the LPF 32 as shown in FIG. 7 and the downward signal may be amplified to a predetermined level in the down-converter 10, though in the above-mentioned embodiment, it was explained that the down-converter 10 passes the downward signal directly.

By doing in such a way, since the downward signal and the upward signal can be respectively amplified to predetermined levels by the amplification circuits 49 and 39 for the downward signal and upward signal, respectively provided in the down-converter 10, the in-building CATV system can be constituted without providing the above-mentioned bi-directional amplifier 12 and branch amplifier 13 on the transmission line L.

In the above-mentioned in-building CATV system, the downward signal, the in-building upward signal and the reference signal were transmitted respectively with different frequency bands to the transmission line L. However, for example, the upward signal whose transmission quality is severely deteriorated due to the periphery noises and the like may be transmitted to the transmission line L after having been frequency-converted to the in-building upward signal using the up-converter 20 and the upward signal whose transmission quality is not deteriorated even when noises intrude may be directly transmitted to the transmission line L without frequency-conversion by the up-converter 20.

Subsequently, the constitution of the down-converter 10 used in the in-building CATV system constituted in such a way will be described referring to FIG. 8.

Figure 8:
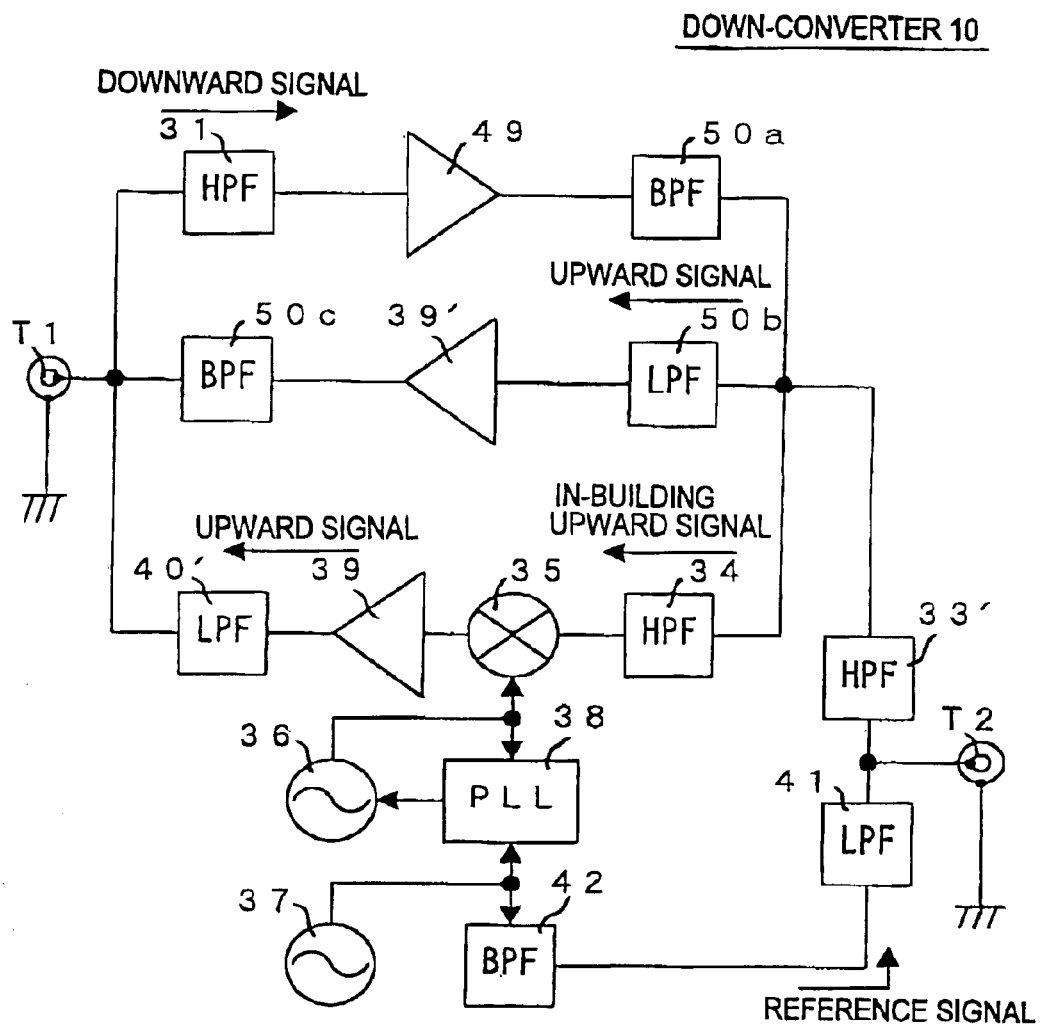
FIG. 8 is a block diagram showing the constitution of a down-converter which can pass an upward signal which is not frequency-converted.

The down-converter 10 in FIG. 8 is basically the same as the down-converter 10 in FIG. 7 provided with the amplification circuit 49 for the downward signal and so only the different point will be described in the following.

When the in-building upward signal frequency-converted in the up-converter 20 and the upward signal which is not frequency-converted are transmitted to the transmission line L, the upward signal frequency-converted to the in-building upward signal in the up-converter 20 and the upward signal which is not frequency-converted should be given with different frequencies, in order that the upward signal passed directly through the down-converter 10 does not turn around to the amplification circuit 39 for amplifying the frequency-converted upward signal at the side of the external connection terminal T1 of the down-converter 10, or the frequency-converted upward signal does not turn around to the path for the upward signal which is not frequency converted and flow into the terminal side from the internal connection terminal T2.

Then, in the following description, the frequency of the upward signal frequency-converted to the in-building upward signal in the up-converter 20 is set to 5 MHz–30 MHz and the frequency of the upward signal which is not frequency-converted is set to 30 MHz–42 MHz.

Since the frequency of the reference signal should not overlap the frequency of the upward signal which is not frequency-converted, the frequency of the reference signal is set to a value lower than 5 MHz in the following description.

As shown in FIG. 8, in the down-converter 10, the downward signal inputted to the external connection terminal T1 is once taken into the down-converter 10 via the HPF 31 which is the same as that in the above-mentioned embodiment and inputted to a BPF 50a after having been amplified in the amplification circuit 49. Since the frequency of the downward signal is higher than that of the upward signal inputted from the internal connection terminal T2 and lower than that of the in-building upward signal, the BPF 50a cuts off these two signals and passes only the downward signal. The frequency band for passing the signal is set, for example, to 54 MHz–890 MHz. The downward signal passed through the BPF 50a is transmitted to the transmission line L at the terminal side via an HPF 33' and the internal connection terminal T2.

The HPF 33' cuts off the reference signal which is lower in frequency than the above-mentioned upward signal and the cutoff frequency is set, for example, to 5 MHz. Therefore, in the down-converter 10 of the present embodiment, a first downward signal path is formed by the HPF 31, the BPF 50a and the HPF 33'.

Subsequently, the in-building upward signal from the terminal side inputted to the internal connection terminal T2 is taken into the up-converter 20 via the HPF 33' and the HPF 34. The in-building upward signal taken into the up-converter 10 via the HPF 34 is frequency-converted to the low frequency upward signal (with 5 MHz–30 MHz) by the mixer 35 and transmitted to the lead-in wire 6 via an LPF 40' and the external connection terminal T1 after having been amplified by the amplification circuit 39. The LPF 40' cuts off the downward signal and the high frequency upward signal (30 MHz–42 MHz) which is not frequency-converted and passes only the frequency-converted upward signal. The cutoff frequency is set, for example, to 30 MHz.

Subsequently, the upward signal from the terminal side inputted to the internal connection terminal T2 is taken into the up-converter 20 via the HPF 33' and an LPF 50b. The upward signal taken into the up-converter 20 via the LPF 50b is transmitted to the lead-in wire 6 via an BPF 60c and the external connection terminal T1 after having been amplified by an amplification circuit 39'.

The LPF 50b cuts off the downward signal and the in-building upward signal and passes only the high frequency upward signal (30 MHz–42 MHz) which is not frequency-converted. The cutoff frequency is set, for example, to 42 MHz, like the above-mentioned LPF 32. The BPF 50c cuts off the downward signal and the frequency-converted low frequency upward signal (5 MHz–30 MHz) and passes only the high frequency upward signal (30 MHz–42 MHz) which is not frequency-converted. The frequency band for passing the signal is set, for example, to 30 MHz–42 MHz. Therefore, in this down-converter 10, a first upward signal path is formed by the HPF 33', the LPF 50b and the BPF 50c.

The down-converter 10 shown in FIG. 8 is provided with the reference oscillation circuit 37 as a reference signal generating means, which transmits the generated reference signal to the transmission line L from the internal connection terminal T2 via the BPF 42 and the LPF 41 as a reference signal transmission means. Among these filters, the LPF 41 passes the reference signal with a frequency lower than 5 MHz and cuts off other signals. The cutoff frequency is set, for example, to 5 MHz. The frequency band of the BPF 42 for passing the signal is set to a narrow band corresponding to the frequency of the reference signal.

The down-converter 10 shown in FIG. 8 can not only pass the downward signal and frequency-convert the in-building upward signal to the upward signal and transmit them to the transmission line L, but also transmit directly the upward signal which is not frequency-converted transmitted from the terminal side to the lead-in wire 6 in such a way. Therefore, by using the down converter 10, the three signals (downward, in-building upward and reference signals) as well as the upward signal which is not frequency-converted by the up-converter 20 can be transmitted to the transmission line L.

Additionally, according to the in-building CATV system capable of transmitting the four transmission signals in such a way, even the subscriber who has no up-converter 20 can communicate with the center equipment of the external bi-directional CATV system. The communication service can thus be enhanced.

When the in-building CATV system is constituted by the down-converter 10 shown in FIG. 8, the reference signal path functions as a second upward signal path if the bi-directional amplifier 12 or the branch amplifier 13 is provided on the transmission line L. Therefore, the above-mentioned bi-directional amplifier 12 or the branch amplifier 13 can be used as it is. Concerning the up-converter 20, the cutoff frequency and the frequency band for passing signals of the LPF 80 and the BPF 81 may be set to the same as the characteristic values of the LPF 41 and the BPF 42 of the down-converter 10.

Second Embodiment

In the above description, explanation was made for the in-building CATV System which bi-directionally transmits/receives the upward/downward signals between the external bi-directional CATV system and the transmission devices like the down-converter used for constituting the system. However, if a reception antenna of common use for every subscriber is set, for example, on a building to be provided with an in-building CATV system, a reception signal from the reception antenna can be sent to each subscriber via a transmission line of the in-building CATV system.

Then, thus constituted in-building CATV system will be explained as a second embodiment of the present invention. In the following description, the same constituents as those of the in-building CATV system of the first embodiment are given with the same notations, with detailed explanation thereof being omitted.

Figure 9:
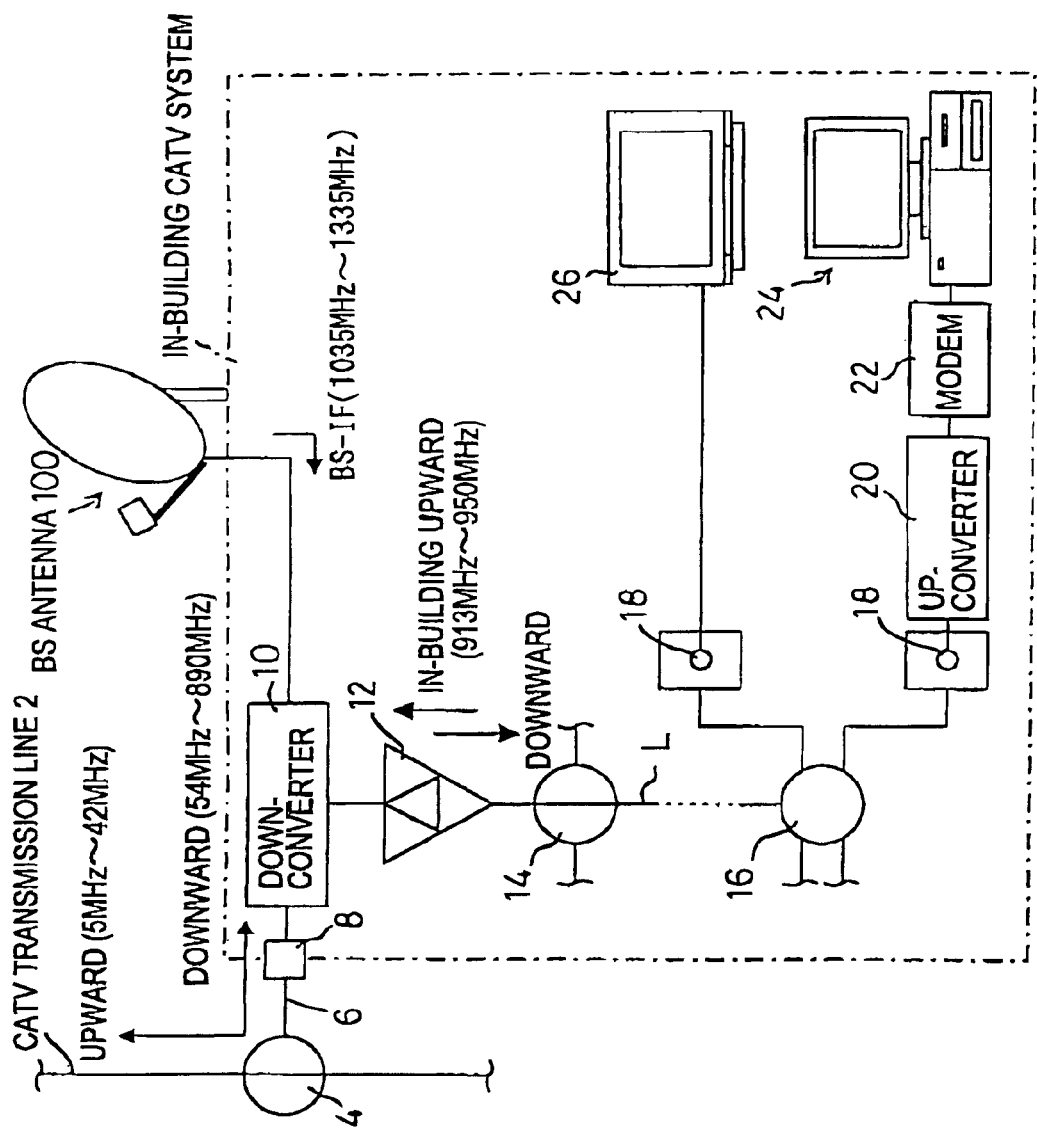
FIG. 9 is a schematic diagram showing the constitution of an in-building CATV system of the second embodiment.

As shown in FIG. 9, the in-building CATV system of the present embodiment is basically constituted as the same as the in-building CATV system of the first embodiment. The difference is that a BS antenna 100 as a reception antenna is provided on a roof or the like of the building and reception signals from the BS antenna can be transmitted to the terminal side via a down-converter 10.

The BS antenna 100 is of a known type which receives a reception wave from the BS (broadcasting satellite) and converts the reception wave to a reception signal (called a BS-IF signal, hereinafter) of a predetermined frequency band (1035 MHz–1334 MHz). It is constituted by a parabola antenna.

[Down-Converter]

Figure 10:
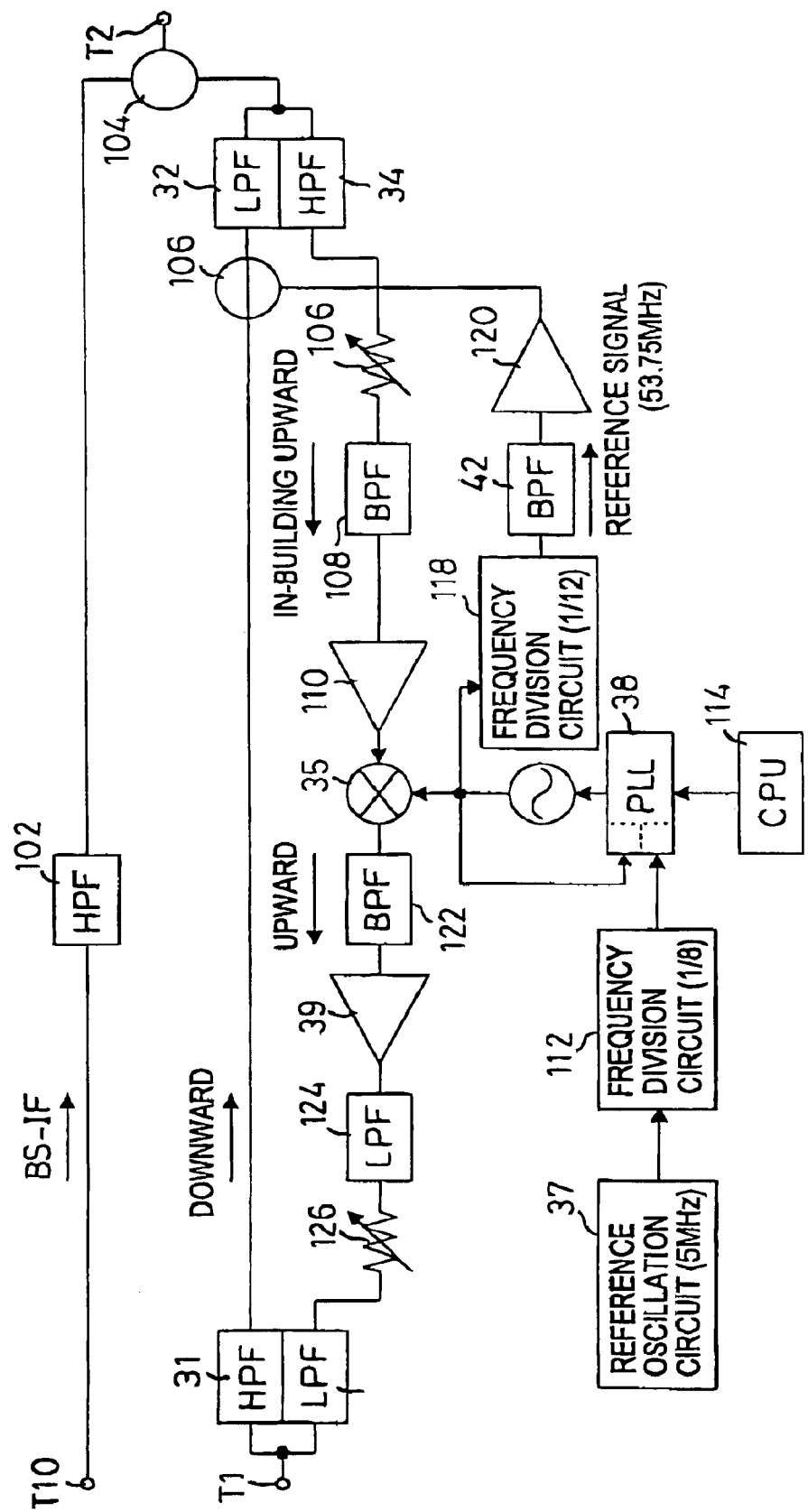
FIG. 10 is a block diagram showing the constitution of a down-converter used in the system of FIG. 9.

As shown in FIG. 10, the down-converter 10 is provided with an external connection terminal T1 for connecting to a lead-in wire from the external bi-directional CATV system as well as a reception signal input terminal T10 for inputting the BS-IF signal from the BS antenna 100. The downward signal and the BS-IF signal inputted to each of the terminals T1, T10 can be transmitted to a transmission line L in the building from the internal connection terminal T2.

Specifically, at first, the downward signal inputted to the external connection terminal T1 is taken into the down-converter 10 via an HPF 31, is passed through an internal downward signal path, transmitted to an LPF 32 and outputted to the internal connection terminal T2 via the LPF 32. A mixing circuit 104 is provided between the LPF 32 and the internal connection terminal T2, the BS-IF signal inputted to the reception signal input terminal T10 and the downward signal passed through the LPF 32 are mixed by the mixing circuit 104 and outputted to the transmission line L from the internal connection terminal T2. An HPF 102 with a cutoff frequency of, for example, 1035 MHz for cutting off an in-building upward signal and passing only the BS-IF signal is provided on a path (reception signal path) of the BS-IF signal from the reception signal input terminal T10 to the mixing circuit 104.

Subsequently, the in-building upward signal inputted to the internal connection terminal T2 from the terminal side is taken into the down-converter 10 via the mixing circuit 104 and an HPF 34, passed through an attenuator 106 for attenuating the in-building upward signal and a BPF 108 for passing the in-building upward signal, inputted to an amplification circuit 110 for amplifying the in-building upward signal, amplified by the amplification circuit 110 to a predetermined level determined by attenuation factor of the attenuator 106 and amplification factor of the amplifier 110 and then inputted to a mixer 35.

Similarly to the above-mentioned embodiment, the mixer 35 receives a high frequency signal from a local oscillation circuit 36 controlled by a PLL circuit 38 to a constant frequency (955 MHz, in the present embodiment, too) and frequency-converts the in-building upward signal to the original upward signal. The frequency-converted upward signal is transmitted to an LPF 40 via a BPF 122 for passing the upward signal, an amplification circuit 39 for amplifying the upward signal, an LPF 124 for passing the upward signal and an attenuator 126 for attenuating the upward signal and outputted to a lead-in wire 6 from the LPF 40 via the external connection terminal T1. The attenuator 126 adjusts the level of the upward signal outputted to the lead-in wire 6 from the external connection terminal T1 via the attenuator 126. The LPF 124 cuts off the downward signal inputted to the external connection signal T1 and passes the frequency-converted upward signal. Its cutoff frequency is set, for example, to 42 MHz.

Moreover, the down-converter 10 of the present embodiment is provided with a reference oscillation circuit 37 whose oscillation frequency is 5 MHz and a frequency division circuit 112 for generating a reference signal with a constant frequency (1.25 MHz in the present embodiment) by frequency-dividing the output signal from the reference oscillation circuit 37 to signal with a ⅛ period. The output signal from the frequency division circuit 112 is inputted to the PLL circuit 38, which takes in an input signal from the frequency division circuit 112 and the output signal from the local oscillation circuit 36 via respective internal frequency division circuits and controls the oscillation frequency of the local oscillation circuit 36 to a constant value (955 MHz) by controlling the local oscillation circuit 36, based on the phase difference of the frequency-divided signal. The down-converter 10 of the present embodiment is provided with a microcomputer (CPU) 114 for setting/changing the oscillation frequency of the local oscillation circuit 36 controlled by the PLL circuit 38 (specifically, a frequency division ratio of the frequency division circuit in the PLL circuit 38) with a command from the outside.

The down-converter 10 of the present embodiment is provided with a frequency division circuit 118 for generating the reference signal for transmission with a constant frequency (in the present embodiment, 53.75 MHz which does not overlap the downward signal in the transmission frequency band of the downward signal from 54 MHz to 890 MHz) by frequency-dividing the output signal (the high frequency signal for frequency conversion) from the local oscillation circuit 36 to signal with a $\frac{1}{12}$ period, a BPF 42 for passing the reference signal for transmission outputted from the frequency division circuit 118, an amplification circuit 120 for amplifying the reference signal passed through the BPF 42 to a predetermined level and a mixer 116 for superimposing the amplified signal on the downward signal path between the HPF 31 and the LPF 32 and outputting it to the terminal side from the LPF 32.

As described above, in the down-converter 10 of the present embodiment, the reference signal is generated by frequency-dividing the output from the built-in reference oscillation circuit 37 in the frequency division circuit 112. Then, the PLL circuit 38 generates a high frequency signal for frequency conversion using the reference signal by controlling the local oscillation circuit 36 and frequency-converts the in-building upward signal to the original upward signal by mixing the high frequency signal with the in-building upward signal in the mixer 35. Further, in order to make the reference signals for frequency conversion used by the down-converter 10 and the up-converter 20 of the terminal side coincide with each other, the reference signal for transmission is generated by frequency-dividing the output from the local oscillation circuit 36 in the frequency division circuit 118 and is transmitted to the transmission line L via the BPF 42, the amplification circuit 120 and the like.

One aspect of the present invention is applied to the down-converter 10 of the present embodiment. The reference oscillation circuit 37 and the frequency division circuit 112 function as a reference signal generating means, the local oscillation circuit 36 and the PLL circuit 38 function as a first frequency conversion means and the frequency division circuit 118, the BPF 42 and the amplification circuit 120 function as a reference signal transmission means.

[Up-Converter]

Figure 11:
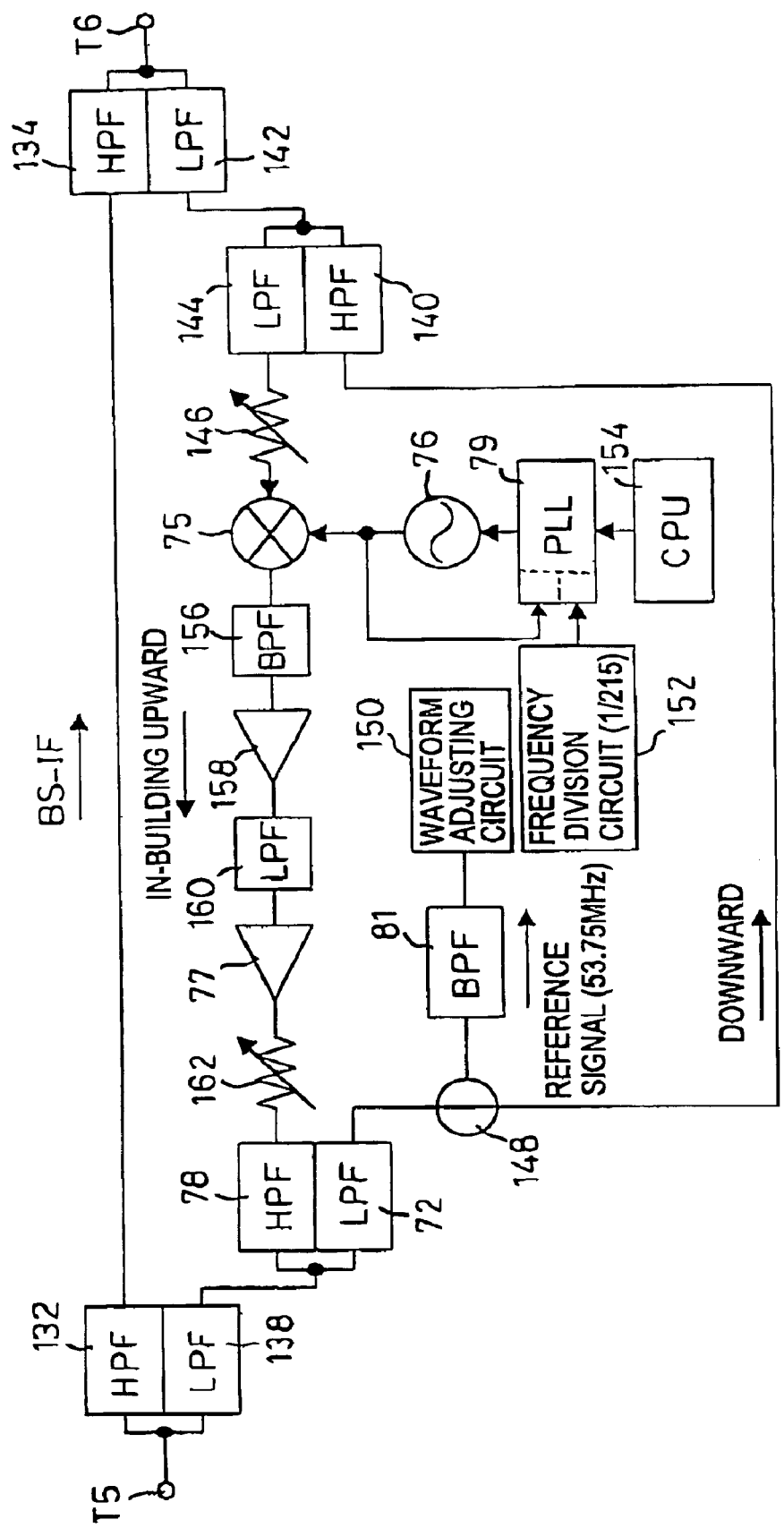
FIG. 11 is a block diagram showing the constitution of an up-converter used in the system of FIG. 9.

In the up-converter 20 of the present embodiment as shown in FIG. 11, the BS-IF signal inputted to a first connection terminal T5 via the transmission line L is taken into the up-converter 20 via an HPF 132 which passes only the BS-IF signal and then outputted to the terminal side from a second connection terminal T6 via an HPF 134 with the same characteristic.

The downward signal inputted to a first connection terminal T5 via the transmission line L is taken into the up-converter 20 via an LPF 138 for cutting off the BS-IF signal and passing other transmission signals and an LPF 72 for cutting off the in-building upward signal and passing the downward signal and inputted to the internal path for the downward signal. The downward signal passed through the path for the downward signal is outputted to the terminal side from a second connection terminal T6 via an HPF 140 for cutting off the upward signal and passing the downward signal and an LPF 142 for cutting off the BS-IF signal and passing other transmission signals.

On the other hand, the upward signal inputted to the second connection terminal T6 from the terminal side is taken into the up-converter 20 via the LPF 142 and an LPF 144 for cutting off the downward signal and passing the upward signal, inputted to a mixer 75 via an attenuator 146 for attenuating the upward signal and frequency-converted to provide the in-building upward signal using the high frequency signal for frequency-conversion outputted from a local oscillation circuit 76.

Like the above-mentioned embodiment, the mixer 75 frequency-converts the upward signal to the in-building upward signal by mixing the high frequency signal from the local oscillation circuit 76 controlled to a constant frequency by a PLL circuit 79 and the upward signal inputted from the terminal side. The frequency of the high frequency signal used for frequency-conversion by the mixer 75 (that is, the oscillation frequency of the local oscillation circuit 76) is set to the same frequency (955 MHz) as the frequency of the high frequency signal used by the down-converter 10 for frequency-converting the in-building upward signal to the upward signal according to a constitution mentioned hereinafter.

The in-building upward signal frequency-converted in the mixer 75 is transmitted to an HPF 78 for cutting off the downward signal and passing the in-building upward signal via a BPF 156 for passing only the in-building upward signal, an amplification circuit 158 for amplifying the in-building upward signal, an LPF 160 for passing the in-building upward signal, an amplification circuit 77 for amplifying the in-building upward signal and an attenuator 162 for attenuating the in-building upward signal and transmitted to the transmission line L from the HPF 78 via the LPF 138 and the first connection terminal T5.

Subsequently, a directional coupler 148 is provided in the downward signal path from the LPF 72 to the HPF 140. The downward signal branched by the directional coupler 148 is inputted to a BPF 81 which passes the reference signal (53.75 MHz in the present embodiment) for transmission transmitted from the down-converter 10. The reference signal passed through a BPF 81 is inputted to a waveform adjusting circuit 150, waveform-adjusted in the waveform adjusting circuit 150 and inputted to a frequency division circuit 162. The frequency division circuit 152 generates a reference signal with a $\frac{1}{5}$ frequency (0.25 MHz) of the reference signal generated by the frequency division circuit 112 of the down-converter 10 by frequency-dividing the reference signal transmitted from the down-converter 10 to provide signal, for example, with a $\frac{1}{215}$ period. Then, the generated reference signal is inputted to the PLL circuit 79.

Then, the PLL circuit 79 takes in the reference signal inputted from the frequency division circuit 162 and the output signal from the local oscillation circuit 76, respectively, via the internal frequency division circuit and controls the oscillation frequency of the local oscillation circuit 76 to a constant frequency (955 MHz) that is the same as that of the local oscillation circuit 36 of the down-converter 10 by controlling the local oscillation circuit 76 based on the phase difference of the frequency-divided signals. The up-converter 20 of the present embodiment, as well as the down-converter 10, is provided with a microcomputer (CPU) 154 for setting/changing the oscillation frequency of the local oscillation circuit 76 controlled by the PLL circuit 79 (specifically, the frequency division ratio of the frequency division circuit in the PLL circuit 79) by a command from the outside.

In such a way, in the up-computer 20 of the present embodiment, by frequency-dividing the reference signal transmitted from the down-converter 10, the reference signal corresponding to the reference signal generated in the down-converter 10 is restored and the PLL circuit 79 generates from the local oscillation circuit 76 the high frequency signal with the same frequency as the high frequency signal generated by the local oscillation circuit 36 of the down-converter 10 by controlling the local oscillation circuit 76 using the reference signal.

Therefore, also in the present embodiment, the down-converter 10 and the up-converter 20 can make the frequencies of the high frequency signals mixed with the in-building upward signal or the upward signal for frequency conversion coincide with each other. The down-converter 10 can precisely restore the original upward signal before being frequency-converted by the up-converter 20.

Another aspect of the present invention is applied to the up-converter 20 of the present embodiment. The directional coupler 148 and the BPF 81 function as a second reference signal extracting means and the waveform adjusting circuit 150 and the frequency division circuit 152 function as a reference signal restoration means.

In the in-building CATV system of the present embodiment, the down-converter 10 and the up-converter 20 make the oscillation frequencies of the local oscillation circuits 36 and 76 coincide with each other. Therefore, the upward signal generated by a cable modem 22 and the like can be precisely restored in the down-converter 10. Moreover, the downward signal transmitted from the external bi-directional CATV system as well as the reception signal from the BS antenna 100 can be transmitted to the terminal 18 of the subscriber. Therefore, according to the in-building CATV system, the subscriber of the in-building CATV system can watch and listen to the BS broadcasting without separately providing a BS antenna, even when the external bi-directional CATV system does not transmit BS broadcasting signals, thereby the service to the subscriber being improved.

Moreover, though the bi-directional amplifier 12 provided on the transmission line L was not described in the above description, in the present embodiment, since the frequency of the reference signal for transmission to the transmission line L is set to 53.75 MHz which does not overlap the downward signal in the transmission frequency band (54 MHz–890 MHz) of the downward signal and does not coincide with the frequency of the downward signal, there is no need to provide in its inside a path for exclusive use for passing the reference signal such as the bi-directional amplifier 12 of the first embodiment shown in FIG. 2 and an ordinary bi-directional amplifier without such a path can be used.

In this case, since the reference signal is transmitted to the transmission line L at the terminal side through the downward signal path in the bi-directional amplifier 12 together with other downward signal and amplified in the amplifier for the downward signal together with the downward signal when being passed through the path, the reference signal can be transmitted 26 to the up-converter 20 with a proper signal level, even if the length of the transmission line L becomes long.

Further, since the down-converter 10 is given with a function for mixing the BS-IF signal and the downward signal and these signals are sent to the terminal side via the transmission line L connected to the down-converter 10 in the present embodiment, an additional transmission line for the BS-IF signal or an additional mixer for mixing the BS-IF signal and the downward signal need not be provided. Therefore, such an in-building CATV system can be constituted cheaply.

Though a system with the BS antenna 100 as a reception antenna was described in the second embodiment, when there are many subscribers who want to receive broadcasting signals from, for example, the communication satellite (CS), the signals may be transmitted by providing a CS antenna. Also in this case, an in-building CATV system can be constituted without providing a mixer and the like for mixing the reception signal of the CS broadcasting and the downward signal, when the down-converter of the present embodiment is used.

Though the down-converter 10 of the present embodiment generates the reference signal for transmission by frequency-dividing the high frequency signal outputted from the local oscillation circuit 36, for example, as shown in FIG. 12, the down-converter 10 may be constituted such that the reference signal for transmission (53.75 MHz) is generated by frequency-dividing (⅕) and multiplying (×215) the reference signal generated in the frequency division circuit 112 (1.25 MHz) using a frequency division circuit 170 and a multiplying circuit 172, respectively.

On the other hand, though in the above-mentioned first and second embodiments, there were described in-building CATV systems in which the transmission frequency band of the downward signal is set to 54 MHz–890 MHz so that an FM radio broadcasting signal and a television broadcasting signal can be transmitted as the downward signals. Needless to say, the present invention can be applied to an in-building CATV system in which the transmission frequency band of the downward signal is set to 26 MHz–890 MHz, in order to transmit, for example, the FM radio broadcasting signal (the transmission frequency band: 88 MHz–108 MHz), television broadcasting signal (the transmission frequency band: 54 MHz–890 MHz) and cable broadcasting signal (the transmission frequency band: 26 MHz–54 MHz) for delivering music and the like can be transmitted as the downward signals.

In case of this in-building CATV system, when the reference signal passed through the transmission line L is set, for example, to a range from 5 MHz to 26 MHz, transmission loss occurring when the reference signal is passed through the transmission line L can be lowered by setting the frequency of the reference signal to a value lower than the frequency band of the downward signal, like the case of the first embodiment. In case of the in-building CATV system, the frequency band of the downward signal in the bi-directional amplifier provided on the transmission line L becomes 26 MHz–890 MHz.

Moreover, for example, in a in-building CATV system for transmitting FM radio signals (transmission frequency band: 88 MHz–108 MHz), television broadcasting signals (transmission frequency band: 54 MHz–890 MHz) and cable broadcasting signals (transmission frequency band: 26 MHz–54 MHz) as the downward signal, the transmission frequency band may be set, for example, to 10 MHz–890 MHz and the frequency of the reference signal for transmission may be set to a value in the range from 10 MHz–26 MHz (for example, 10.7 MHz) lower than that of any of the above-mentioned transmission signals, so that the reference signal can be transmitted as one of the downward signals, similarly to the second embodiment.

When such an in-building CATV system is constituted, since the reference signal can be amplified by the bi-directional amplifier together with the downward signal, the same effect as that of the above-mentioned second embodiment can be attained, even though it is necessary to set the frequency band of the downward signal for transmission in the bi-directional amplifier on the transmission line L to 10 MHz–890 MHz.

What is claimed is:

1. An in-building CATV system connected to a lead-in wire from an external bi-directional CATV system for transmitting a downward signal inputted from said lead-in wire to plural in-building terminals via in-building transmission lines, transmitting an in-building upward signal inputted to said terminals via an up-converter for frequency-converting an upward signal outputted from a terminal device, with a frequency lower than that of said downward signal to an in-building upward signal with a frequency higher than that of said downward signal, and frequency-convert said in-building upward signal to an upward signal with an original frequency outputted from said terminal device by a down-converter provided between said transmission line and said lead-in wire to transmit said upward signal to said lead-in wire, wherein the in-building CATV system comprises:
   a reference signal generating means for generating a reference signal with a constant frequency different from that of any of various transmission signals flowing upward and downward in said transmission line, and
   a reference signal transmission means for transmitting said reference signal generated by said reference signal generating means to said transmission line, and
   said up-converter at the terminal side and said down-converter at said lead-in wire side can frequency-convert said upward signal and said in-building upward signal, respectively using said reference signal with the constant frequency, wherein
   said reference signal generating means and said reference signal transmission means are provided in said down-converter.

2. The in-building CATV system according to claim 1, wherein
   the frequency of the reference signal transmitted to said transmission line by said reference signal transmission means is set to a frequency which is within a range of a frequency band set as a transmission frequency band of said downward signal in the in-building CATV system and does not overlap with said downward signal.

3. The in-building CATV system according to claim 1, wherein
   an upward signal with a low frequency which has not been frequency-converted by said up-converter can be directly transmitted to said lead-in wire.

4. The in-building CATV system according to claim 1, wherein
   a reception antenna is provided on said building and a reception signal from said reception antenna can be transmitted to said plural terminals via said transmission line together with said downward signal.

5. An in-building CATV system connected to a lead-in wire from an external bi-directional CATV system for transmitting a downward signal inputted from said lead-in wire to plural in-building terminals via in-building transmission lines, transmitting an in-building upward signal inputted to said terminals via an up-converter for frequency-converting an upward signal outputted from a terminal device, with a frequency lower than that of said downward signal to an in-building upward signal with a frequency higher than that of said downward signal, and frequency-convert said in-building upward signal to an upward signal with an original frequency outputted from said terminal device by a down-converter provided between said transmission line and said lead-in wire to transmit said upward signal to said lead-in wire, wherein the in-building CATV system comprises:
   a reference signal generating means for generating a reference signal with a constant frequency different from that of any of various transmission signals flowing upward and downward in said transmission line,
   a reference signal transmission means for transmitting said reference signal generated by said reference signal generating means to said transmission line, and
   said up-converter at the terminal side and said down-converter at said lead-in wire side can frequency-convert said upward signal and said in-building upward signal, respectively using said reference signal with the constant frequency,
   wherein the frequency of the reference signal transmitted to said transmission line by said reference signal transmission means is set to a frequency lower than that of any of various transmission signals flowing upward and downward through said transmission line.

6. The in-building CATV system according to claim 5, wherein
   the frequency of the reference signal transmitted to said transmission line by said reference signal transmission means is set to a value within a range from 5 MHz to 26 MHz, lower than a frequency band set as a transmission frequency band for said downward signal in the in-building CATV system.

7. A down-converter in an in-building CATV system connected to a lead-in wire from an external bi-directional CATV system for transmitting a downward signal inputted from said lead-in wire to plural in-building terminals via in-building transmission lines, transmitting an in-building upward signal inputted to said terminals via an up-converter for frequency-converting an upward signal outputted from a terminal device, with a frequency lower than that of said downward signal to an in-building upward signal with a frequency higher than that of said downward signal, and frequency-convert said in-building upward signal to an upward signal with an original frequency outputted from said terminal device by a down-converter provided between said transmission line and said lead-in wire to transmit said upward signal to said lead-in wire, wherein the in-building CATV system comprises:
   a reference signal generating means for generating a reference signal with a constant frequency different from that of any of various transmission signals flowing upward and downward in said transmission line,
   a reference signal transmission means for transmitting said reference signal generated by said reference signal generating means to said transmission line, and
   said up-converter at the terminal side and said down-converter at said lead-in wire side can frequency-convert said upward signal and said in-building upward signal, respectively using said reference signal with the constant frequency,
   wherein the down converter provided between said lead-in wire and said transmission line, comprises:
   a first downward signal path for transmitting a downward signal inputted from an external bi-directional CATV system via said lead-in wire to said transmission line,
   a first reference signal extracting means for extracting said reference signal with a constant frequency among upward transmission signals inputted via said transmission line, and
   a first frequency conversion means for taking out said in-building upward signal among upward transmission signals inputted via said transmission line, for frequency-converting said in-building upward signal to the original upward signal outputted from said terminal device using the reference signal extracted by said reference signal extracting means and for transmitting said frequency-converted upward signal to said lead-in wire.

8. The down-converter according to claim 7, wherein the down converter is provided with a first determining means for determining whether a reference signal is extracted by said first reference signal extracting means or not, and a first specific transmission signal extracting means for extracting a specific transmission signal with a fixed frequency among downward signals flowing through said first downward signal path and for outputting said specific transmission signal to said first frequency conversion means as said reference signal.

9. The down-converter according to claim 7, wherein the down-converter is provided with:

a first downward signal path for transmitting the downward signal inputted from an external bi-directional CATV system via said lead-in wire, a reference signal generating means for generating the reference signal with a constant frequency different from that of either of an upward and downward signals flowing through said transmission line, a first frequency conversion means for taking out said in-building upward signal among upward transmission signals inputted via said transmission line, for frequency-converting said in-building upward signal to the original upward signal outputted from said terminal device using the reference signal generated by said reference signal generating means and for transmitting said frequency-converted upward signal to said lead-in wire, and a reference signal transmission means for transmitting the reference signal generated by said reference signal generating means tot said transmission line.

10. The down-converter according to claim 9, wherein the frequency of the reference signal transmitted to said transmission line by said reference signal transmission means is set to a frequency which is within a frequency band set as a transmission frequency band for said downward signal in the in-building CATV system provided with said down-converter and which does not overlap said downward signal.

11. The down-converter according to claim 9, wherein the frequency of the reference signal transmitted to said transmission line by said reference signal transmission means is set to a frequency lower than that of any of various transmission signals flowing upward and downward through said transmission line.

12. The down-converter according to claim 11, wherein the frequency of the reference signal transmitted to said transmission line by said reference signal transmission means is set to a frequency within a range from 5 MHz to 26 MHz which is lower than a frequency band set as a transmission frequency band for said downward signal in the in-building CATV system provided with said down-converter.

13. The down-converter according to claim 9, wherein said reference signal transmission means generates the reference signal for transmission by frequency-dividing or multiplying a reference signal generated by said reference signal generating means and transmits said reference signal to said transmission line.

14. The down-converter according to claim 9, wherein said reference signal transmission means generates the reference signal for transmission by frequency-dividing or multiplying a high frequency signal for frequency conversion generated by said first frequency conversion means based on the reference signal generated by said reference signal generating means and transmits said reference signal to said transmission line.

15. The down-converter according to claim 7, wherein the down-converter is provided with a first upward signal path for transmitting the low frequency upward signal which is not frequency-converted by said up-converter among upward transmission signals inputted via said transmission line.

16. The down-converter according to claim 7, wherein the down-converter is provided with a downward signal amplification means in said first downward signal path for amplifying said downward signal passed through said first downward signal path and an upward signal amplification means in an in-building upward signal input path to said first frequency conversion means or an upward signal output path from said first frequency conversion means for amplifying said in-building upward signal or said upward signal passed through said path.

17. The down-converter according to claim 7, wherein the down-converter is provided with a reception signal input terminal for inputting a reception signal from a reception antenna equipped on a building provided with said down-converter and a reception signal path for sending the reception signal inputted to said reception signal input terminal to said transmission line together with said downward signal.

18. An up-converter in an in-building CATV system connected to a lead-in wire from an external bi-directional CATV system for transmitting a downward signal inputted from said lead-in wire to plural in-building terminals via in-building transmission lines, transmitting an in-building upward signal inputted to said terminals via an up-converter for frequency-converting an upward signal outputted from a terminal device, with a frequency lower than that of said downward signal to an in-building upward signal with a frequency higher than that of said downward signal, and frequency-convert said in-building upward signal to an upward signal with an original frequency outputted from said terminal device by a down-converter provided between said transmission line and said lead-in wire to transmit said upward signal to said lead-in wire, wherein the in-building CATV system comprises:

a reference signal generating means for generating a reference signal with a constant frequency different from that of any of various transmission signals flowing upward and downward in said transmission line, a reference signal transmission means for transmitting said reference signal generated by said reference signal generating means to said transmission line, and said up-converter at the terminal side and said down-converter at said lead-in wire side can frequency-convert said upward signal and said in-building upward signal, respectively using said reference signal with the constant frequency, wherein the up-converter provided between said terminal and said terminal device in the in-building CATV system is provided with:

a second downward signal path for sending the downward signal transmitted to said terminal via said transmission line to said terminal device, a second reference signal extracting means for extracting said reference signal with a constant frequency among downward transmission signals transmitted to said terminal via said transmission line, and a second frequency conversion means for frequency-converting the upward signal outputted from said terminal device to said in-building upward signal using the reference signal extracted by said second reference signal extracting means and for transmitting said frequency-converted in-building upward signal to said transmission line via said terminal.

19. The up-converter according to claim 18, wherein the up-converter is provided with:

a second determining means for determining whether the reference signal is extracted by said second reference signal extracting means or not and a second specific transmission signal extracting means for extracting a specific transmission signal with a fixed frequency among downward signals flowing through said second downward signal path and for outputting said specific transmission signal to said second frequency conversion means as said reference signal, when it is determined by said second determining means that said reference signal is not extracted.

20. The up-converter according to claim 18, wherein the up-converter is provided with a reference signal restoration means for restoring the reference signal corresponding to the reference signal used for frequency-converting the in-building upward signal to the upward signal by said down-converter by frequency-dividing or multiplying the reference signal extracted by said second reference signal extracting means, and said second frequency conversion means frequency-converts said upward signal to said in-building upward signal using the reference signal restored by said reference signal restoration means.

21. An amplifier in an in-building CATV system connected to a lead-in wire from an external bi-directional CATV system for transmitting a downward signal inputted from said lead-in wire to plural in-building terminals via in-building transmission lines, transmitting an in-building upward signal inputted to said terminals via an up-converter for frequency-converting an upward signal outputted from a terminal device, with a frequency lower than that of said downward signal to an in-building upward signal with a frequency higher than that of said downward signal, and frequency-convert said in-building upward signal to an upward signal with an original frequency outputted from said terminal device by a down-converter provided between said transmission line and said lead-in wire to transmit said upward signal to said lead-in wire, wherein the in-building CATV system comprises:

a reference signal generating means for generating a reference signal with a constant frequency different from that of any of various transmission signals flowing upward and downward in said transmission line, a reference signal transmission means for transmitting said reference signal generated by said reference signal generating means to said transmission line, and said up-converter at the terminal side and said down-converter at said lead-in wire side can frequency-convert said upward signal and said in-building upward signal, respectively using said reference signal with the constant frequency, wherein the amplifier is provided on the transmission line from said down-converter to said terminal in the in-building CATV system, the amplifier provided with:

a third downward signal path for sending the downward signal transmitted from said down-converter via said transmission line to the terminal side, a downward signal amplification means provided on said third downward signal path for amplifying said downward signal, an in-building upward signal path for sending the in-building upward signal transmitted from said terminal side via said transmission line to said down-converter, an in-building upward signal amplification means provided on said in-building upward signal path for amplifying said in-building upward signal, and a first reference signal path for connecting the transmission line of said down-converter and the transmission line of said terminal side so that said reference signal can be passed through said first reference signal path.

22. The amplifier according to claim 21, wherein the amplifier is provided with a second upward signal path for connecting the transmission line of said down-converter and the transmission line of said terminal side so that the low frequency upward signal which is not frequency-converted by said down-converter can be passed through said second upward signal path.

23. The amplifier according to claim 21, wherein the amplifier is provided with:

one or plural branch terminals, a downward signal branching means for branching a part of the downward signal amplified by said downward signal amplification means and for outputting the branched downward signal from said branch terminals, an in-building upward signal input means for transmitting the in-building upward signal inputted to said branch terminal to said in-building upward signal path at the input side of said in-building upward signal amplification means, and a second reference signal path for connecting said branch terminal and said first reference signal path so that said reference signal can be passed through said second reference signal path.

* * * * *